United States Patent
Moteki et al.

(10) Patent No.: US 10,997,702 B2
(45) Date of Patent: May 4, 2021

(54) INSPECTION APPARATUS, INSPECTION METHOD, AND COMPUTER READABLE RECORDING MEDIUM STORING INSPECTION PROGRAM

(71) Applicant: FUJITSU LIMITED, Kawasaki (JP)

(72) Inventors: Atsunori Moteki, Chofu (JP); Toshiyuki Yoshitake, Kawasaki (JP); Ayu Karasudani, Yamato (JP); Mitsuhiro Makita, Sagamihara (JP)

(73) Assignee: FUJITSU PATENT CENTER, Kawasaki (JP)

( * ) Notice: Subject to any disclaimer, the term of this patent is extended or adjusted under 35 U.S.C. 154(b) by 162 days.

(21) Appl. No.: 16/294,031

(22) Filed: Mar. 6, 2019

(65) Prior Publication Data

US 2019/0287233 A1    Sep. 19, 2019

(30) Foreign Application Priority Data

Mar. 14, 2018    (JP) .............................. JP2018-046251

(51) Int. Cl.
*G06T 7/00* (2017.01)
*G06T 7/543* (2017.01)
(Continued)

(52) U.S. Cl.
CPC .......... *G06T 7/0002* (2013.01); *G06K 9/4604* (2013.01); *G06K 9/6276* (2013.01); *G06T 7/543* (2017.01)

(58) Field of Classification Search
CPC ..... G06T 7/0002; G06T 7/543; G06K 9/4604; G06K 9/6276
See application file for complete search history.

(56) References Cited

U.S. PATENT DOCUMENTS 10,742,963 B2 *   8/2020   Naito ..................... B33Y 50/00
2012/0027289 A1   2/2012   Naruse et al.
(Continued)

FOREIGN PATENT DOCUMENTS

| JP | 2012-032344 | 2/2012 |
| JP | 2017-091078 | 5/2017 |
| JP | 2017-182302 | 10/2017 |

OTHER PUBLICATIONS

Z. Zhang, "A Flexible New Technique for Camera Calibration", IEEE Transactions on Pattern Analysis and Machine Intelligence, vol. 22, No. 11, pp. 1330-1334, Nov. 2000 (5 pages).
(Continued)

*Primary Examiner* — Kim Y Vu
*Assistant Examiner* — Molly Delaney
(74) *Attorney, Agent, or Firm* — Fujitsu Patent Center

(57) ABSTRACT

An inspection apparatus includes a memory for storing shape information including a plurality of line segments representing a shape of an object; and a processor coupled to the memory and the processor that detects a plurality of feature lines from an image of the object, generates a plurality of combinations obtained by correlating each of the plurality of line segments and each of the plurality of feature lines with each other, generates a plurality of projection lines by projecting each of the plurality of line segments onto the image, sets a threshold value with respect to an error between a position of the projection lines and a position of the feature lines of the line segments included in each of the plurality of combinations based on a statistical value of the error, and classifies the plurality of combinations using the threshold value.

12 Claims, 20 Drawing Sheets

(51) Int. Cl.
G06K 9/62 (2006.01)
G06K 9/46 (2006.01)

(56) References Cited

U.S. PATENT DOCUMENTS

2015/0310604 A1* 10/2015 Lim .................. G06T 7/0004
                                                      382/141
2017/0132752 A1  5/2017 Aoyagi et al.
2017/0287154 A1 10/2017 Yamaguchi

OTHER PUBLICATIONS

R. G. Gioi et al., "LSD: a Line Segment Detector", Image Processing on Line, 2 (2012), pp. 35-55, Mar. 2012 (21 pages).
L. G. Roberts, "Machine Perception of Three-Dimensional Solids", MIT Lincoln Lab. Rep., TR3315, pp. 1-82, May 1963 (82 pages).
C. Xu et al., "Pose Estimation from Line Correspondences: A Complete Analysis and a Series of Solutions", IEEE Transactions on Pattern Analysis and Machine Intelligence, vol. 39, No. 6, pp. 1209-1222, Jun. 2017 (14 pages).
P. Meer et al., "Robust Regression Methods for Computer Vision: A Review", International Journal of Computer Vision, vol. 6, Issue 1, pp. 59-70, Apr. 1991 (12 pages).

* cited by examiner

FIG. 5

| ID | START POINT [mm] | END POINT [mm] |
|---|---|---|
| 1 | (0, 0, 0) | (0, 0, 15) |
| 2 | (0, 10, 0) | (0, 15, 10) |
| ... | ... | ... |
| 20 | (25, 15, 10) | (25, 15, 30) |

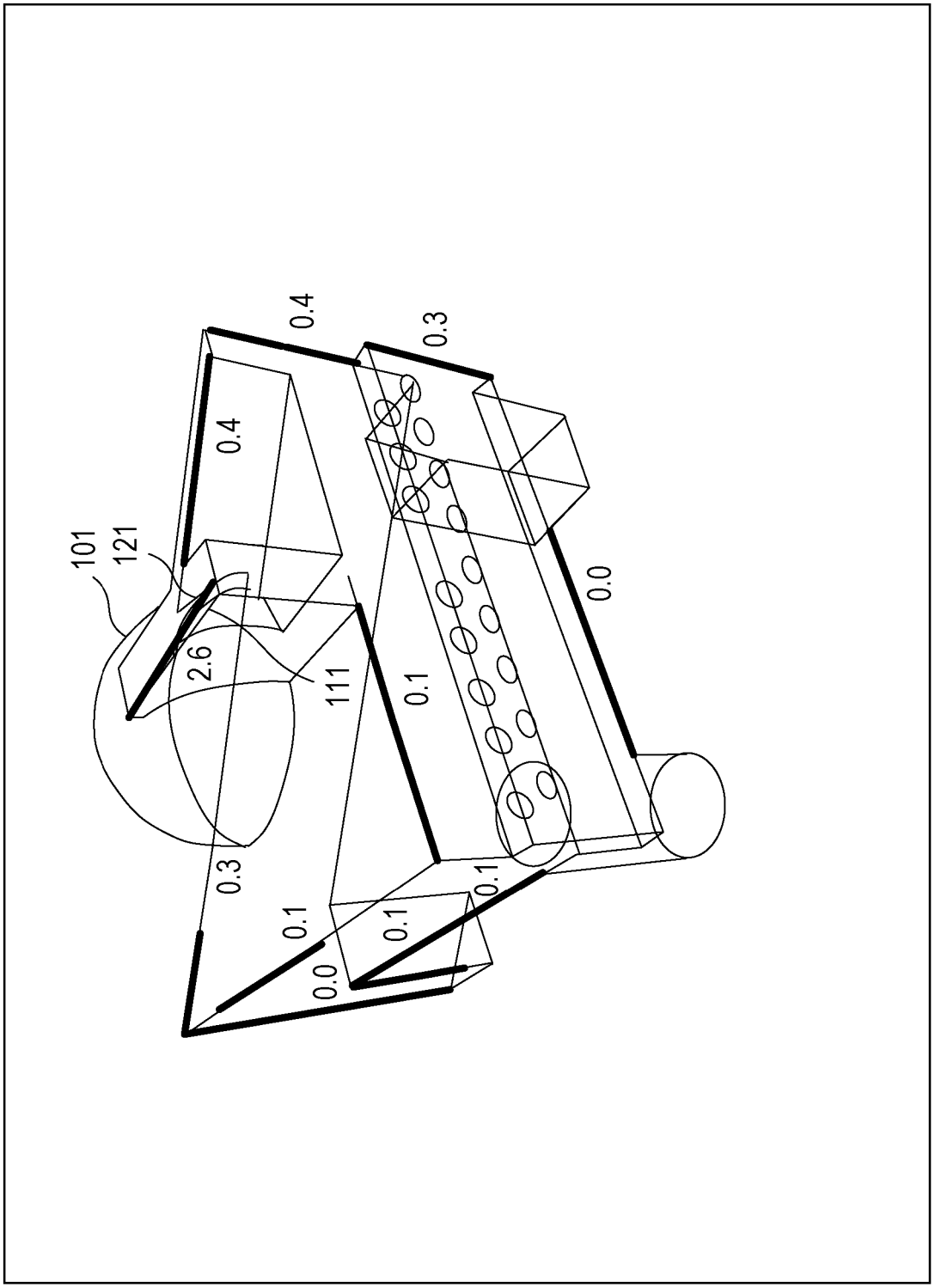

INSPECTION APPARATUS, INSPECTION METHOD, AND COMPUTER READABLE RECORDING MEDIUM STORING INSPECTION PROGRAM

CROSS-REFERENCE TO RELATED APPLICATION

This application is based upon and claims the benefit of priority of the prior Japanese Patent Application No. 2018-46251, filed on Mar. 14, 2018, the entire contents of which are incorporated herein by reference.

FIELD

The embodiments discussed herein are related to an inspection apparatus, an inspection method, and a computer readable recording medium storing an inspection program.

BACKGROUND

In recent years, systems that display images using augmented reality (AR) technology have become widespread. In an example of the AR technology, an object is captured using a camera mounted on a personal computer (PC), a portable terminal device, and the like, and the position and orientation of the camera in three-dimensional space are estimated from the image of the object. Then, based on the determined position and orientation of the camera, the content information is superimposed and displayed at a certain position in the image.

An inspection of products at the work site where the products are manufactured is often performed by skilled workers over a period of time using a dedicated jig. However, if workers other than skilled workers may easily perform the inspection, it will be possible to reduce the inspection cost.

There is known a technique of superimposing a model image of a spatial structure on a shot image in a manner such that an edge line extracted from the shot image and a ridge line included in the model image overlap with each other (for example, see Japanese Laid-open Patent Publication No. 2017-91078). There is also known a technique of estimating a position of an image capturing apparatus by using the predetermined number of combinations obtained by correlating projection lines obtained by projecting candidate lines included in shape information of an object onto an image to feature lines detected from the images (for example, see Japanese Laid-open Patent Publication No. 2017-182302). There is also known a technique of displaying statistical information of an error representing an amount of displacement between an edge position of a workpiece image and a position on a master image corresponding to the edge position along the edge position (for example, see Japanese Laid-open Patent Publication No. 2012-32344).

There is also known a technique such as camera calibration, line segment detection, spatial mechanical perception, orientation estimation from line correspondences, and robust regression method for computer vision (for example, see Z. Zhang, "A Flexible New Technique for Camera Calibration", IEEE Transactions on Pattern Analysis and Machine Intelligence, Vol. 22, No. 11, pp. 1330-1334, November 2000, R. G. Gioi et al., "LSD: a Line Segment Detector", Image Processing On Line, 2 (2012), pp. 35-55, March 2012, L. G. Roberts, "Machine perception of three-dimensional solids", MIT Lincoln Lab. Rep., TR 3315, pp. 1-82, May 1963, C. Xu et al., "Pose Estimation from Line Correspondences: A Complete Analysis and a Series of Solutions", IEEE Transactions on Pattern Analysis and Machine Intelligence, Vol. 39, No. 6, pp. 1209-1222, June 2017, and P. Meer et al., "Robust Regression Methods for Computer Vision: A Review", International Journal of Computer Vision, Vol. 6, Issue 1, pp. 59-70, April 1991).

SUMMARY

According to an aspect of the embodiments, an inspection apparatus includes a memory for storing shape information including a plurality of line segments representing a shape of an object; and a processor coupled to the memory and the processor that detects a plurality of feature lines from an image of the object, generates a plurality of combinations obtained by correlating each of the plurality of line segments and each of the plurality of feature lines with each other, generates a plurality of projection lines by projecting each of the plurality of line segments onto the image, sets a threshold value with respect to an error between a position of the projection lines and a position of the feature lines of the line segments included in each of the plurality of combinations based on a statistical value of the error, and classifies the plurality of combinations using the threshold value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating CAD data;

FIG. 12 is a view illustrating the corresponding pair set displayed on the screen;

DESCRIPTION OF EMBODIMENTS

As an application of AR technology, for example, manufacturing diagnosis may be performed by superimposing and displaying computer-aided design (CAD) data representing a three-dimensional shape of a product manufactured at the work site on an image of the product. However, it is difficult to accurately identify the manufacturing defective portion that does not coincide with the shape represented by the CAD data from the amount of deviation between the position of a projection line obtained by projecting the 3D line segment included in the CAD data of the product onto the image of the product and the position of the feature line detected from the image.

Such a problem arises not only when performing manufacturing diagnosis of the product by using CAD data, but also when inspecting the shape of an object using other shape information.

Hereinafter, embodiments will be described in detail with reference to the drawings.

In the manufacturing diagnosis, it is desirable that not only the CAD data is superimposed and displayed on the image, but also the manufacturing defective portion of the product which does not coincide with the shape represented by the CAD data is highlighted, or the amount of deviation between the shape represented by the CAD data and the shape of the product is quantitatively indicated.

Therefore, a method combining the techniques of Japanese Laid-open Patent Publication No. 2017-182302 and Japanese Laid-open Patent Publication No. 2012-32344 may be considered. In this method, the amount of deviation between the position of the projection line obtained by projecting the 3D line segment included in the CAD data onto the image of the product and the position of the feature line detected from the image is calculated. Then, when the amount of deviation exceeds a preset threshold value, the projection line and the feature line are highlighted and the amount of deviation is indicated.

However, since the amount of deviation is changed according to the estimation result of the position and orientation of the camera that captured the image, it is difficult to set in advance an appropriate threshold value that serves as a determination criterion for the manufacturing defects. Further, even when the error is in the correlation between the projection line and the feature line, if the amount of deviation between the projection line and the feature line exceeds the threshold value, it is determined that the manufacturing defects occurred.

Figure 1:
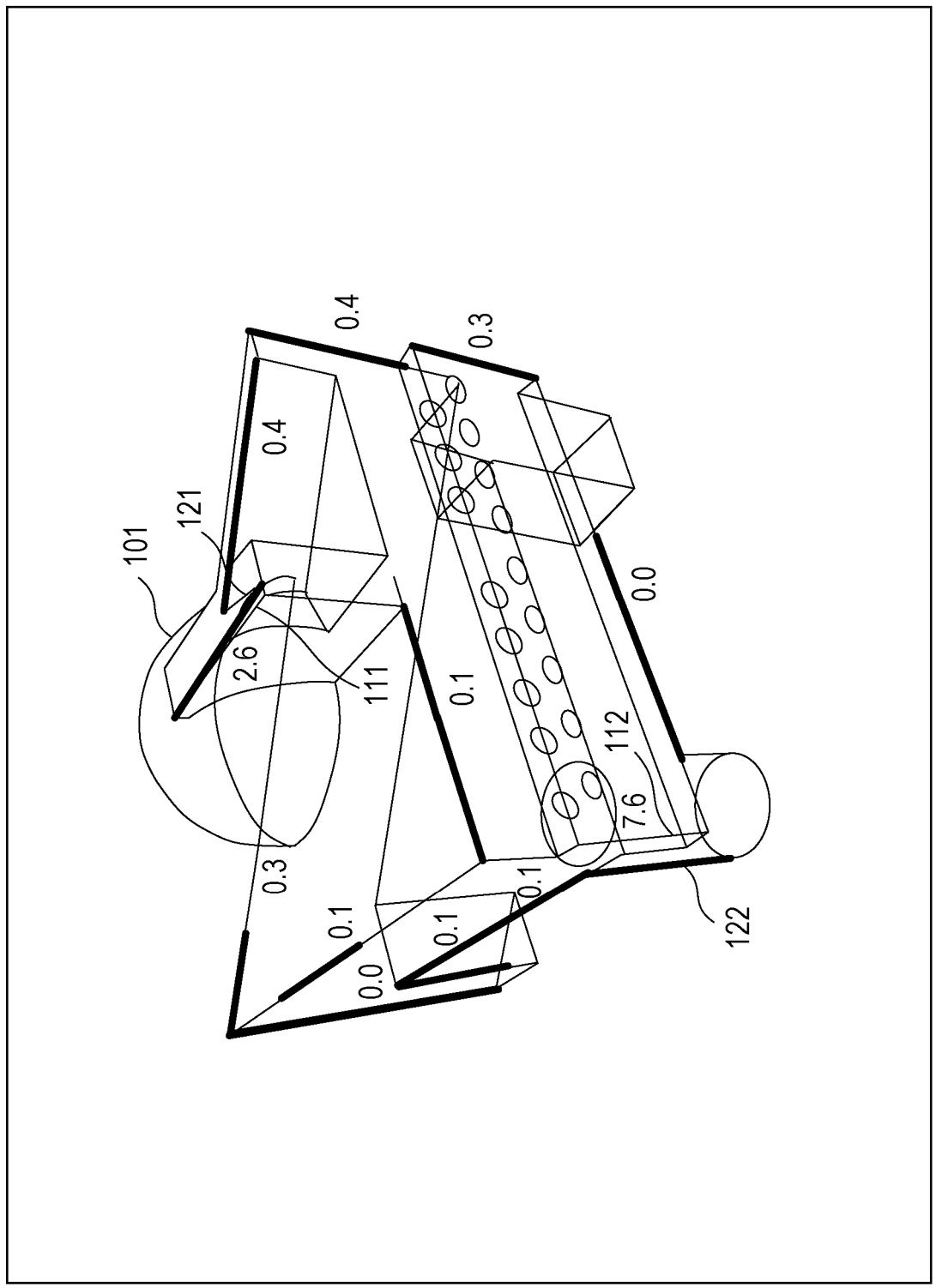
FIG. 1 is a view illustrating a 3D line segment and a feature line.

FIG. 1 illustrates an example of a 3D line segment and a feature line. An object 101 captured in an image is displayed in the center of a screen, and the projection line obtained by projecting a 3D line segment included in the CAD data of the object 101 onto the image is superimposed and displayed on the object 101. Thick lines on the object 101 represent feature lines detected from the object 101. The numbers displayed near the projection lines and the feature lines represent values obtained by converting the amount of deviation between the positions of the projection lines and the positions of the feature lines into distances in the three-dimensional space with the unit being mm.

For example, an amount of deviation between the projection line 111 and the feature line 121 is 2.6 mm, and this amount of deviation represents a defective portion of the shape of the object 101. While the amount of deviation is distributed in the range of 0.0 mm to 7.6 mm in this example, it is difficult to determine a specific threshold value to be set as the determination criterion for the manufacturing defect.

On the other hand, the amount of deviation between the projection line 112 and feature line 122 is 7.6 mm, and this amount of deviation does not represent a defective portion of the shape of the object 101, but represents an error in the correlation between the projection line 112 and the feature line 122. For example, when the threshold value is set to 1.0 mm, the combination of the projection line 112 and the feature line 122 as well as the combination of the projection line 111 and the feature line 121 are determined to be defective portions.

As described above, with the method combining the techniques of Japanese Laid-open Patent Publication No. 2017-182302 and Japanese Laid-open Patent Publication No. 2012-32344, it is difficult to accurately identify a manufacturing defective portion that does not coincide with the shape represented by the CAD data of the product.

Figure 2:
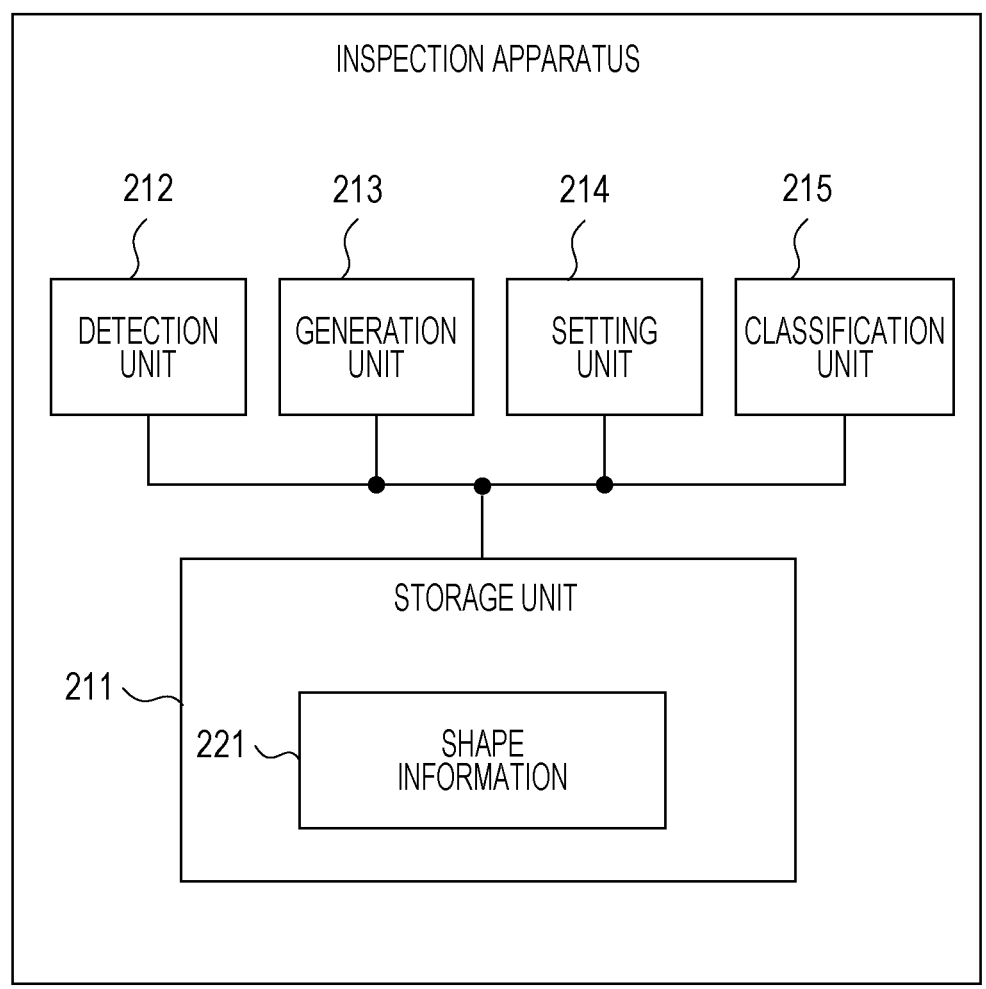
FIG. 2 is a functional block diagram of an inspection apparatus.

FIG. 2 illustrates an example of a functional configuration of the inspection apparatus according to an embodiment. The inspection apparatus 201 in FIG. 2 includes a storage unit 211, a detection unit 212, a generation unit 213, a setting unit 214, and a classification unit 215. The storage unit 211 stores shape information 221 including a plurality of line segments representing the shape of the object.

Figure 3:
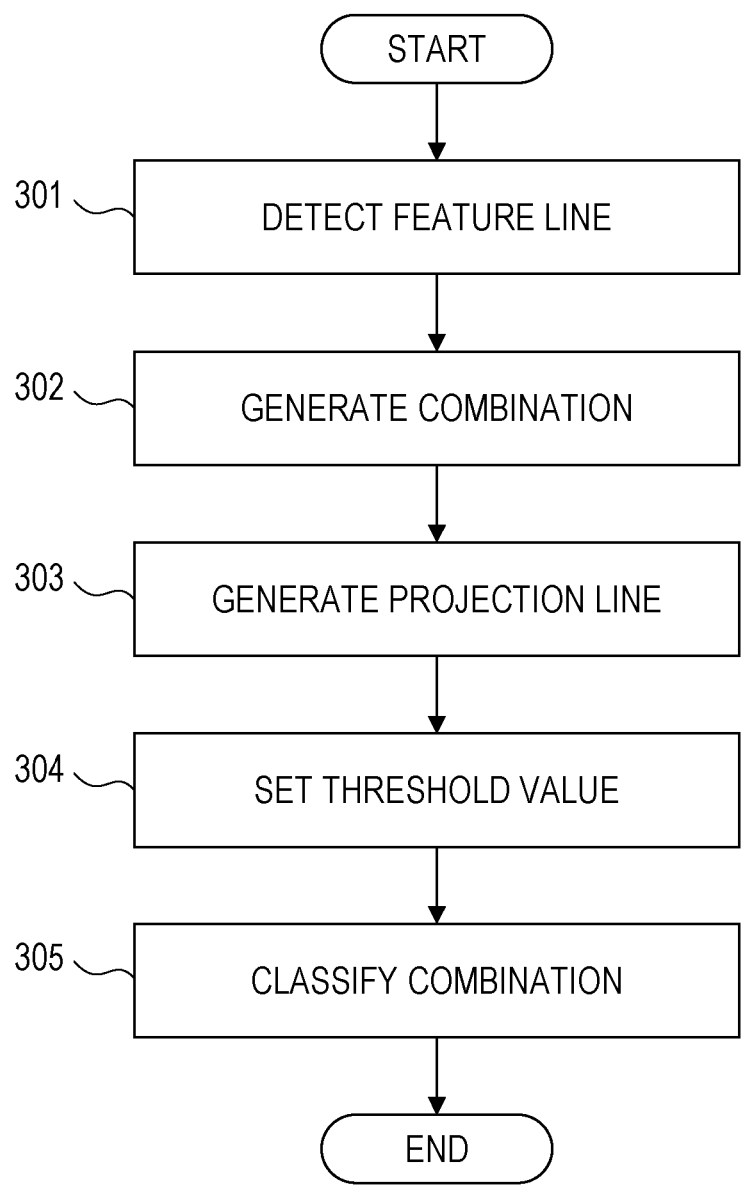
FIG. 3 is a flowchart illustrating image processing.

FIG. 3 is a flowchart illustrating an example of image processing performed by the inspection apparatus 201 in FIG. 2. First, the detection unit 212 detects a plurality of feature lines from an image of an object captured by the image capturing apparatus (step 301).

Next, the generation unit 213 generates a plurality of combinations obtained by correlating each of a plurality of line segments included in the shape information 221 with each of a plurality of feature lines (step 302).

Next, the setting unit 214 generates a plurality of the projection lines by projecting each of the plurality of line segments onto the image (step 303). Then, the setting unit 214 sets a threshold value for error based on the statistical value of the error between the position of the projection line and the position of the feature line included in each of the plurality of combinations (step 304). The classification unit 215 classifies the plurality of combinations using the threshold value (step 305).

According to such an inspection apparatus 201, the shape inspection for inspecting the shape of the object using the shape information of the object is able to identify a defective portion that does not coincide with the shape information.

Figure 4:
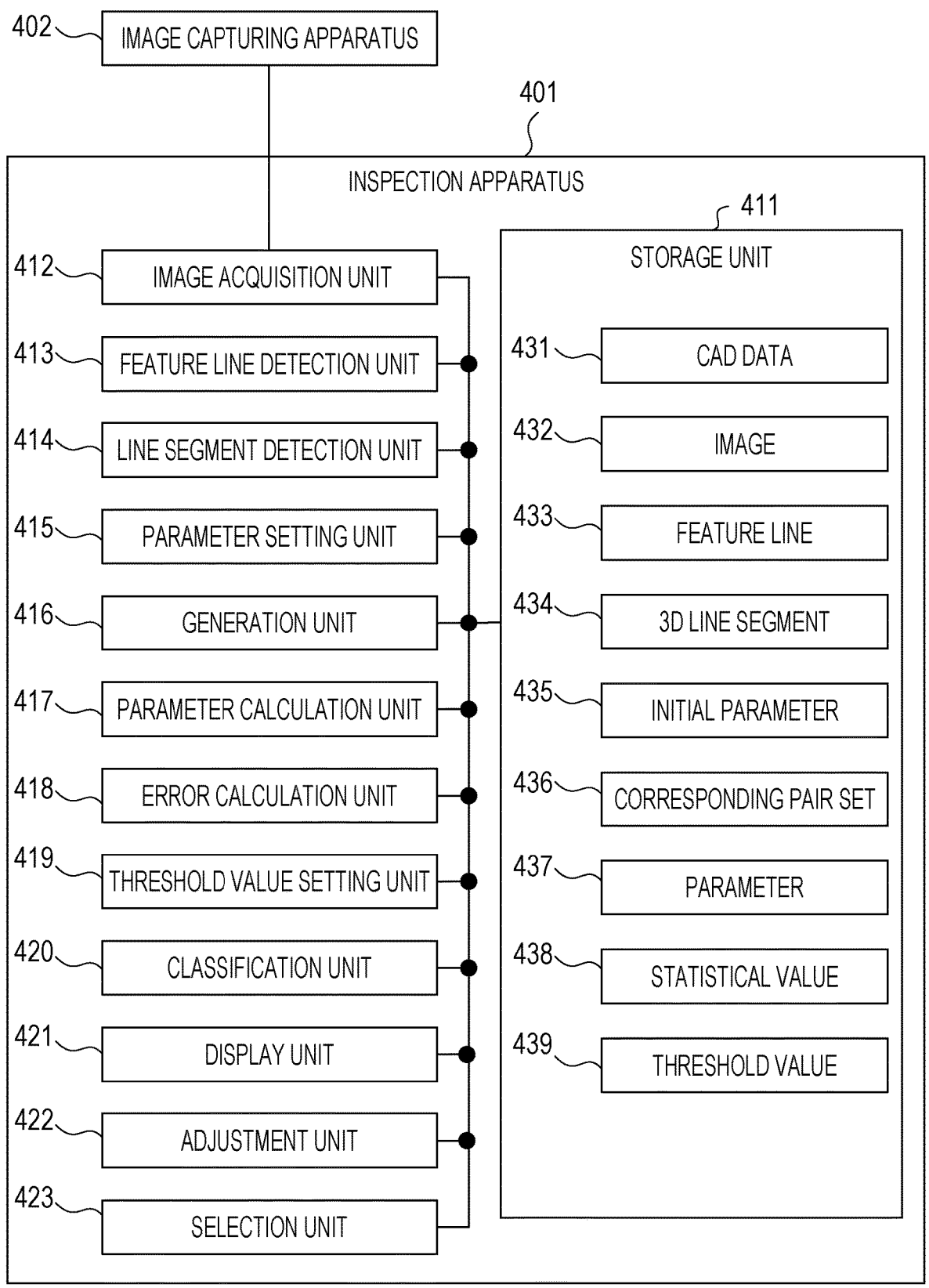
FIG. 4 is a functional block diagram of a first detailed embodiment of the inspection apparatus.

FIG. 4 illustrates a first detailed embodiment of the inspection apparatus 201 in FIG. 2. The inspection apparatus 401 in FIG. 4 includes a storage unit 411, an image acquisition unit 412, a feature line detection unit 413, a line segment detection unit 414, a parameter setting unit 415, a generation unit 416, a parameter calculation unit 417, and an error calculation unit 418. Further, the inspection apparatus 401 includes a threshold value setting unit 419, a classification unit 420, a display unit 421, an adjustment unit 422, and a selection unit 423.

The storage unit 411, the feature line detection unit 413, the generation unit 416, and the classification unit 420 correspond to the storage unit 211, the detection unit 212, the generation unit 213, and the classification unit 215 in FIG. 2, respectively, and the error calculation unit 418 and the threshold value setting unit 419 correspond to the setting unit 214. The parameter calculation unit 417 operates as an estimation unit that estimates the position and orientation of the image capturing apparatus 402 in the three-dimensional space.

The inspection apparatus 401 is used in shape inspection for inspecting the shape of the object using the shape information of the object. The inspection apparatus 401 may be a portable terminal device such as a tablet, a laptop personal computer (PC), and a smart device, or may be an information processing apparatus such as a desktop PC.

The storage unit 411 stores CAD data 431. The CAD data 431 corresponds to the shape information 221 in FIG. 2 and includes vertex information of a plurality of vertices representing the three-dimensional shape of the object and line segment information of a plurality of line segments. The vertex information includes three-dimensional coordinates of each vertex of the object, and the line segment information includes identification information representing vertices at both ends of each line segment, or three-dimensional coordinates of vertices at both ends of each line segment. The CAD data 431 may be OBJ format data.

FIG. 5 illustrates an example of the CAD data 431. The CAD data 431 in FIG. 5 includes an ID, a start point, and an end point. ID represents identification information of a line segment, the start point represents three-dimensional coordinates of one end point of the line segment, and the end point represents three-dimensional coordinates of the other end point of the line segment.

The image capturing apparatus 402 is a camera having imaging elements such as charged-coupled device (CCD), complementary metal-oxide-semiconductor (CMOS), and the like and captures an image 432 of an object represented by the CAD data 431. The image acquisition unit 412 acquires the image 432 from the image capturing apparatus 402 and stores the acquired image in the storage unit 411.

The feature line detection unit 413 performs edge detection processing to detect a plurality of edge lines from the image 432 and stores the detected edge line in the storage unit 411 as the feature line 433. The feature line detection unit 413 may detect an edge line from the image 432 by using the technique of R. G. Gioi et al., "LSD: a Line Segment Detector", Image Processing On Line, 2 (2012), pp. 35-55, March 2012, for example. The line segment detection unit 414 detects a plurality of line segments included in the CAD data 431 and stores the detected plurality of line segments in the storage unit 411 as a plurality of 3D line segments 434.

The parameter setting unit 415 sets an initial parameter 435 representing the initial position and initial orientation of the image capturing apparatus 402 in the three-dimensional space. First, the parameter setting unit 415 projects the object represented by the CAD data 431 onto the image 432 to display the image 432 and the shape of the object on the screen.

Figure 6:
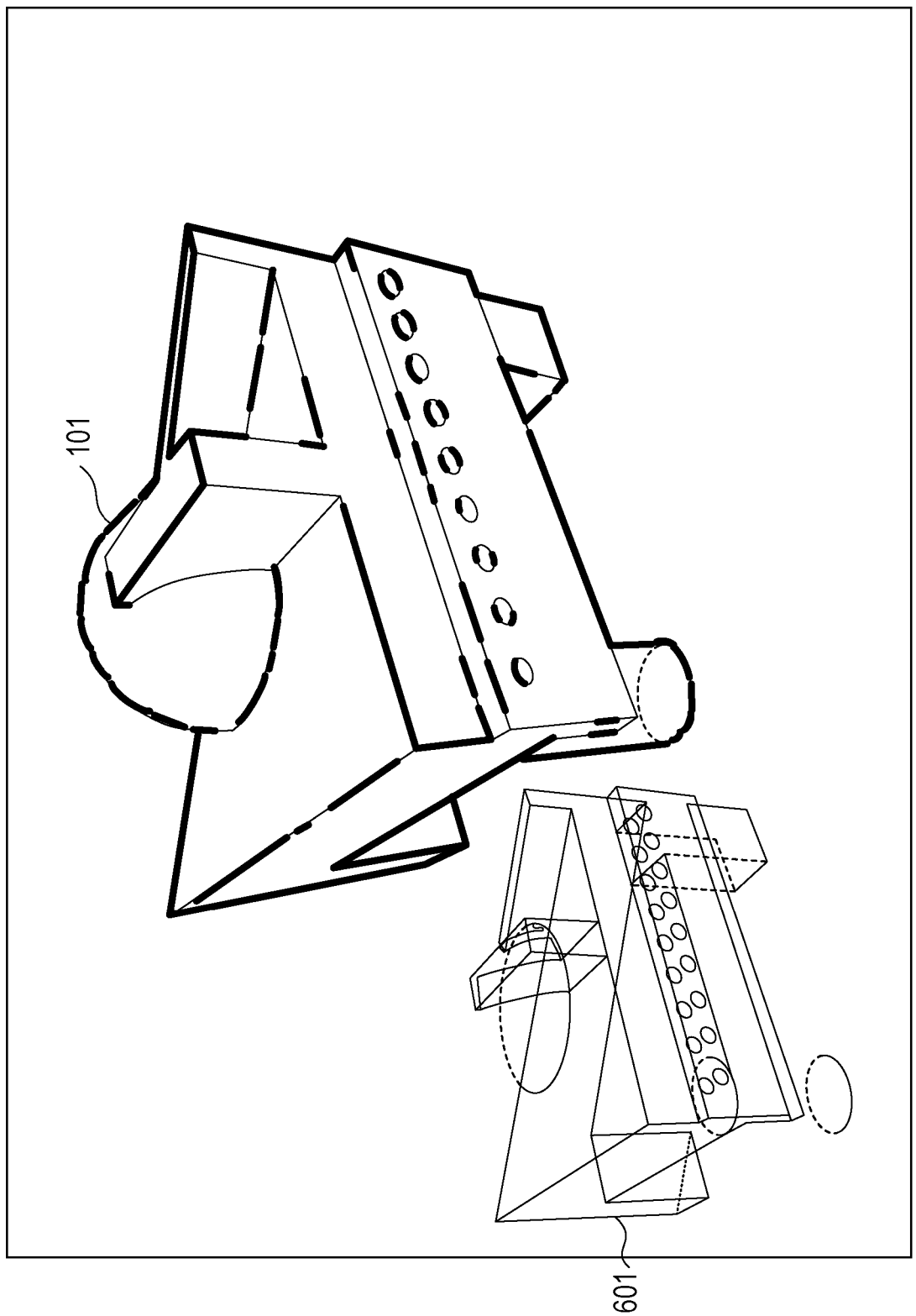
FIG. 6 is a view illustrating an image displayed on a screen.

FIG. 6 illustrates an example of the image 432 and the shape of the object displayed on the screen. The object 101 captured in the image 432 is displayed in the center of the screen, and a feature line 433 detected from the object 101 is displayed on the object 101. In addition, a 3D line segment 434 detected from the CAD data 431 is projected on a lower left side to the object 101, and a shape 601 of the object is displayed using the projection line of the 3D line segment 434.

The user performs an operation of changing the position and orientation of the shape 601 on the screen so that the position and orientation of the shape 601 are approximate to the object 101. The position and orientation of the viewpoint with respect to the screen is changed by changing the position and orientation of the shape 601 on the screen. Therefore, the parameter setting unit 415 uses the position and orientation of the viewpoint corresponding to the position and orientation of the shape 601 determined by the user as the initial position and initial orientation of the image capturing apparatus 402. Then, the parameter setting unit 415 stores the parameters representing the initial position and initial orientation in the storage unit 411 as initial parameters 435.

The generation unit 416 removes the 3D line segments included in the shape 601, for example, a 3D line segment (a hidden line) which is not observed from the viewpoint. The generation unit 416 may remove the hidden line using the technique of L. G. Roberts, "Machine perception of three-dimensional solids", MIT Lincoln Lab. Rep., TR 3315, pp. 1-82, May 1963, for example.

The parameter setting unit 415 may also automatically determine the initial parameters 435 using the technique described in Japanese Patent Application No. 2017-195787 which is the prior application. According to this technique, orientation information representing the position and orientation of an object observed from each of a plurality of viewpoints in a three-dimensional space, a viewpoint image of the observed object, and a feature amount extracted from the viewpoint image are stored in the storage unit in correlation with each other. Then, the degree of similarity between the feature amount of the image captured by the image capturing apparatus and the feature amount of each viewpoint image is calculated, and the orientation information of the viewpoint image having the maximum degree of similarity is determined as the orientation information representing the initial position and the initial orientation of the object.

The initial position and the initial orientation represented by the initial parameter 435 are temporary positions and orientations and do not necessarily coincide with the position and orientation of the image capturing apparatus 402 when the image 432 was captured.

Next, the user designates k (k is a certain integer equal to or greater than 4) combinations of the projection lines and feature lines from the projection line or the feature line 433 of the 3D line segment 434 displayed on the screen. The generation unit 416 uses a combination (corresponding pair) of the 3D line segment represented by the designated projection line and the designated feature line as the initial corresponding pair. In this case, k initial corresponding pairs are generated.

The generation unit 416 may also automatically determine the initial corresponding pair using the technique described in Japanese Patent Application No. 2016-187515, which is another prior application. According to this technique, a plurality of feature lines satisfying a predetermined condition are extracted from a plurality of feature lines detected from an image. Next, k corresponding pairs are generated from the extracted feature lines and the remaining 3D line segments from which the hidden line has been removed, and the total sum of errors between the position of the projection line of the 3D line segment included in each corresponding pair and the position of the feature line is calculated. Then, the calculating the total sum of the errors is repeated, while changing the combination of the 3D line segment and the feature line included in the k corresponding pairs, and k corresponding pairs having a minimum total sum of the errors are determined as k initial corresponding pairs.

The parameter calculation unit 417 calculates the position and orientation of the image capturing apparatus 402 at the time of capturing the image 432 using the k initial corresponding pairs. The parameter calculation unit 417 may calculate a 3×3 rotation matrix R and a translation vector T representing the position and orientation from k initial corresponding pairs using the technique of C. Xu et al., "Pose Estimation from Line Correspondences: A Complete Analysis and a Series of Solutions", IEEE Transactions on Pattern Analysis and Machine Intelligence, Vol. 39, No. 6, pp. 1209-1222, June 2017, for example.

The generation unit 416 generates projection lines by projecting the 3D line segments 434 onto the image 432 using the position and orientation of the image capturing apparatus 402 calculated by the parameter calculation unit 417. For example, the generation unit 416 may project the 3D line segment 434 onto the image 432 by the following equation.

$$\begin{pmatrix} u \\ v \\ 1 \end{pmatrix} = A \begin{pmatrix} R & T \\ 0 & 1 \end{pmatrix} \begin{pmatrix} X \\ Y \\ Z \\ 1 \end{pmatrix} \qquad (1)$$

The definitions of (X, Y, Z), A, R, T, and (u, v) in Equation (1) are as follows.

(X, Y, Z): three-dimensional coordinates of end points of 3D line segment

A: internal parameters of the image capturing apparatus 402

R: 3×3 rotation matrix

T: translation vector (u, v): two-dimensional coordinates of the end point of the projection line on the image 432

The internal parameter A of the image capturing apparatus 402 may be measured in advance using the technique of Z. Zhang, "A Flexible New Technique for Camera Calibration", IEEE Transactions on Pattern Analysis and Machine Intelligence, Vol. 22, No. 11, pp. 1330-1334, November 2000, for example.

Next, the generation unit 416 selects the projection line of the additional 3D line segment to be added to the initial corresponding pair from among the generated projection lines, selects an additional feature line correlated with the additional 3D line segment from the feature line 433, and generates an additional corresponding pair obtained by correlating the additional 3D line segment and the additional feature line with each other. Then, the generation unit 416 stores the set of the initial corresponding pair and the additional corresponding pair in the storage unit 411 as the corresponding pair set 436. Therefore, the number N of corresponding pairs included in the corresponding pair set 436 is equal to or greater than k+1.

For example, the generation unit 416 may select the projection line of the additional 3D line segment in a descending order of the length of the projection lines using the technique of Japanese Laid-open Patent Publication No. 2017-182302, and select the feature line that satisfies the following condition with respect to the selected projection line as the additional feature line.

(C1) Distance between midpoint of the projection line and midpoint of feature line<threshold value (C2) Angle formed by the projection line and feature line<threshold value An upper limit may be provided for the number of the additional feature lines. In addition, since there is a possibility that two or more feature lines are detected from one side of an object as segments, when two or more feature lines are present on the same straight line, the generation unit 416 may select only one feature line as the additional feature line. Further, the generation unit 416 may exclude feature lines shorter than a predetermined value from the candidate additional feature lines. For example, a value of 5% to 20% of the length of the longest feature line may be used as the predetermined value.

Next, the parameter calculation unit 417 selects k corresponding pairs from N corresponding pairs included in the corresponding pair set 436, and uses the selected k corresponding pairs to calculate the position and orientation of the image capturing apparatus 402. Then, the parameter calculation unit 417 stores the parameters representing the calculated position and orientation in the storage unit 411 as the parameter 437. For example, R and T in Equation (1) may be used as the parameter 437.

The parameter calculation unit 417 repeats the process of calculating the parameter 437 a plurality of times while changing the selection of the k corresponding pairs. The error calculation unit 418 generates N−k projection lines by projecting the 3D line segments included in the remaining N−k corresponding pairs in the corresponding pair set 436 onto the image 432 by using R and T represented by the parameter 437 every time the parameter 437 is calculated.

Next, the error calculation unit 418 calculates an error between the position of the generated projection line and the position of the feature line included in the corresponding pair, calculates the statistical value 438 of the error of each of N−k corresponding pairs, and stores the calculated statistical value of the error in the storage unit 411. A median value, an average value, a minimum value, or the like may be used as the calculated statistical value 438 of the error.

Figure 7:
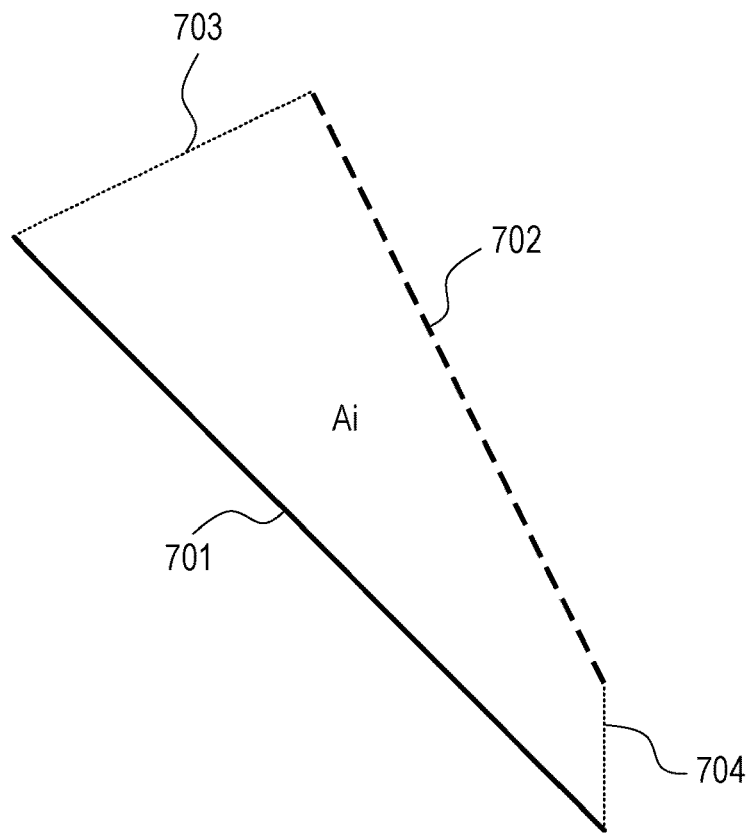
FIG. 7 is a view illustrating a calculation method of an error based on an area.

FIG. 7 illustrates an example of a calculation method of an error based on an area of a region between the projection line and the feature line. When the projection line of the 3D line segments included in the i-th (i=1 to N−k) corresponding pair among the N−k corresponding pairs is a line segment 701 and the feature line is a line segment 702, a line segment 703 and a line segment 704 may be defined, connecting both ends of the line segment 701 and both ends of the line segment 702, respectively. In this case, the area Ai of the region surrounded by the line segments 701 to 704 may be used as the error Ei between the position of the projection line and the position of the feature line.

$$Ei=Ai \qquad (2)$$

The smaller the area Ai is, the smaller the error Ei is, and when the line segment 701 overlaps with the line segment 702, the error Ei is zero.

Figure 8:
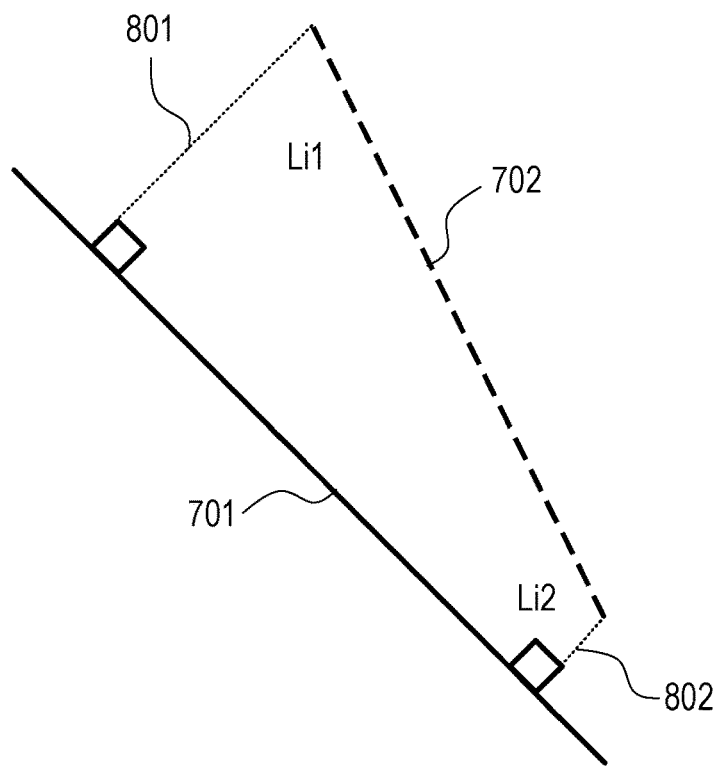
FIG. 8 is a view illustrating a calculation method of an error based on a distance.

FIG. 8 illustrates an example of a calculation method of an error based on a distance between the projection line and the feature line. It is assumed that the lengths of the perpendicular line 801 and the perpendicular line 802 descending from both ends of the line segment 702 onto the line segment 701 are Li1 and Li2, respectively. In this case, the sum of Li1 and Li2 may be used as the error Ei.

$$Ei=Li1+Li2 \qquad (3)$$

The shorter Li1 and Li2, the smaller the error Ei, and when the line segment 701 overlaps with the line segment 702, the error Ei is zero.

The error calculation unit 418 calculates the minimum value of the statistical value 438 calculated using each parameter 437. The threshold value setting unit 419 calculates a threshold value 439 for the error using the minimum value of the statistical value 438, and stores the threshold value in the storage unit 411. For example, the threshold value setting unit 419 may calculate a threshold value TH from a standard deviation a by the following equation using the technique of P. Meer et al., "Robust Regression Methods for Computer Vision: A Review", International Journal of Computer Vision, Vol. 6, Issue 1, pp. 59-70, April 1991 to use the threshold value TH as the threshold value 439 when the median value med of N–k errors is used as the statistical value 438.

$$TH=2.5*\sigma \quad (4)$$

$$\sigma=C*\{1+(5/(N-k))\}*(\text{med})^{1/2} \quad (5)$$

$$C=1.4826 \quad (6)$$

Figure 9:
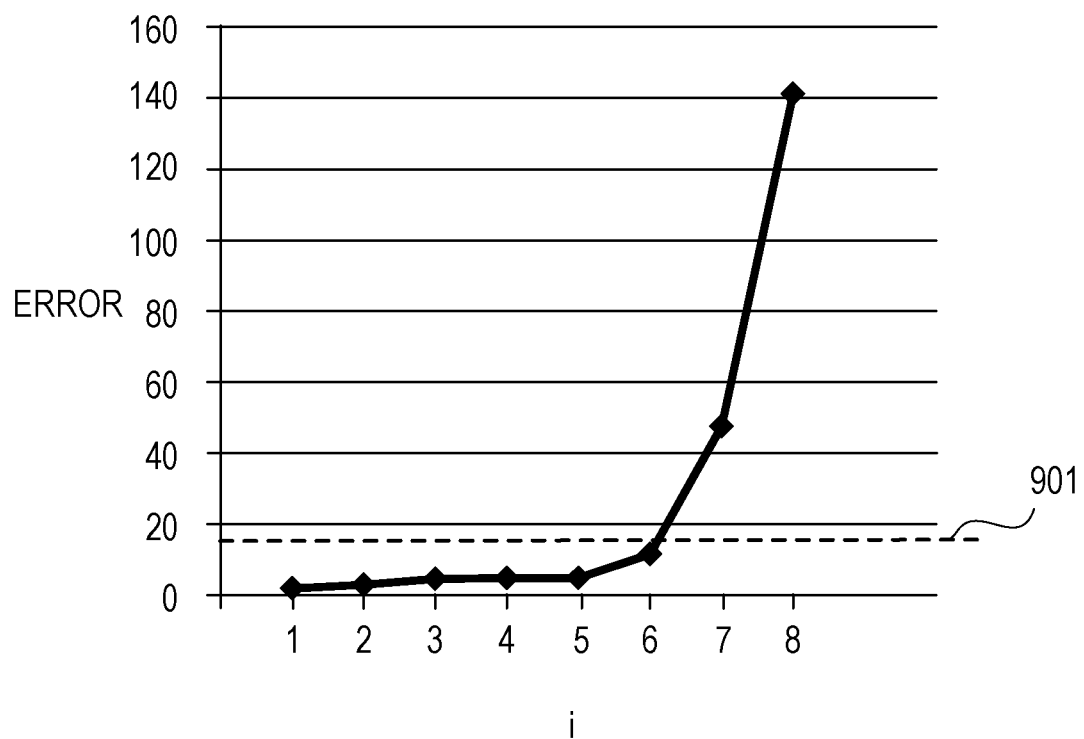
FIG. 9 is a diagram illustrating an error between a projection line and a feature line.

FIG. 9 illustrates an example of an error between the projection line and the feature line illustrated in FIG. 1. In this example, N=12, k=4, the horizontal axis represents the corresponding pair of i-th (i=1 to 8), and the vertical axis represents the error Ei of the i-th corresponding pair.

The first to sixth corresponding pairs represent corresponding pairs of good shapes of the object 101 in which the 3D line segments and the feature lines are correctly correlated with each other, and the errors are overall similar to each other. On the other hand, the seventh corresponding pair represents a corresponding pair of the 3D line segment and the feature line 121 of the projection line 111, which is a defective portion of the shape, and the error is prominent compared with the first to sixth corresponding pairs. In addition, the eighth corresponding pair represents a corresponding pair of the 3D line segment and the feature line 122 of the projection line 112 that are incorrectly correlated, and the error is much greater than the error of the seventh corresponding pair.

Dashed-line 901 represents the threshold value TH calculated using Equations (4) to (6). In this case, TH=13.2, the errors of the first to sixth corresponding pairs are less than TH, and the errors of the seventh and eighth corresponding pairs are greater than TH. In this way, it is possible to distinguish between a corresponding pair of a good shape and a corresponding pair of a defective portion by suppressing the influence of the external error value using the threshold value TH of Equation (4).

Next, the classification unit 420 selects the parameter 437 used for calculating the minimum value of the statistical value 438, and uses the selected parameter 437 to project the 3D line segments included in the corresponding pair set 436 onto the image 432 again, thereby generating a projection line. Then, the classification unit 420 calculates an error between the position of the generated projection line and the position of the feature line included in the corresponding pair, and classifies the corresponding pair having an error less than the threshold value 439 as a corresponding pair that is correctly correlated with each other (correct corresponding pair).

Meanwhile, there is a possibility that a corresponding pair having an error greater than the threshold value 439 includes not only a corresponding pair representing a defective portion of the shape of the object, but also an erroneously correlated corresponding pair (erroneous corresponding pair). In this case, it is desirable to exclude the erroneous corresponding pairs from the corresponding pairs having an error greater than the threshold value 439, and to extract only the corresponding pairs of the defective portions.

Therefore, the classification unit 420 extracts a corresponding pair having an error greater than the threshold value 439 from the corresponding pair set 436 as a corresponding pair to be determined. Then, the classification unit 420 determines whether the corresponding pair to be determined is to be classified as a defective portion in the shape of the object or not, based on the connected state between the 3D line segments included in the corresponding pair to be determined and the 3D line segments included in another corresponding pair. For example, the classification unit 420 may determine whether the corresponding pair to be determined is determined as a defective portion or not based on the following determination criteria.

(P1) The classification unit 420 selects, as another corresponding pair, a corresponding pair including a feature line having an end point whose distance from the end point of the feature line included in the corresponding pair to be determined is less than a predetermined value. Then, when the distance between the end point of the 3D line segment included in the corresponding pair to be determined and the end point of the 3D line segment included in another corresponding pair is less than a predetermined value, the classification unit 420 classifies the corresponding pair to be determined as the defective portion. Further, the classification unit 420 classifies the corresponding pair to be determined as an erroneous corresponding pair when the distance between the end points of the 3D line segments is greater than the predetermined value.

(P2) The classification unit 420 selects, as another corresponding pair, a corresponding pair including a 3D line segment having an end point whose distance from the end point of the 3D line segment included in the corresponding pair to be determined is less than a predetermined value. Then, when the distance between the end point of the feature line included in the corresponding pair to be determined and the end point of the feature line included in another corresponding pair is less than a predetermined value, the classification unit 420 classifies the corresponding pair to be determined as a defective portion. Further, the classification unit 420 classifies the corresponding pairs to be determined as an erroneous corresponding pairs when the distance between the end points of the feature lines is greater than the predetermined value.

According to the determination criterion (P1), when there is a feature line of another corresponding pair near the feature line of the corresponding pair to be determined, it is possible to easily determine whether the corresponding pair to be determined is the corresponding pair of the defective portion or the erroneous corresponding pair.

According to the determination criterion (P2), even when there is no feature line of another corresponding pair near the feature line of the corresponding pair to be determined, it is possible to easily determine whether the corresponding pair to be determined is the corresponding pair of the defective portion or the erroneous corresponding pair.

The classification unit 420 may classify the corresponding pair to be determined according to either the determination criterion (P1) or (P2), or may classify the corresponding pair to be determined by using both of the determination criteria. Hereinafter, when the distance between the end points of two 3D line segments is less than a predetermined value, it may be said that these 3D line segments are connected to each other. Likewise, when the distance between the end points of the two feature lines is less than a predetermined value, it may be said that these feature lines are connected to each other.

The display unit 421 displays a part or the whole of the corresponding pair set 436 on the screen and displays the amount of deviation between the 3D line segment and the feature line of each corresponding pair. For example, the display unit 421 excludes erroneous corresponding pairs from the corresponding pair set 436, displays only the correct corresponding pairs and the corresponding pairs of the defective portion, and highlights the corresponding pairs of the defective portions thereof.

As a result, the user may easily confirm the defective portion of the shape of the object which does not coincide with the shape represented by the CAD data 431, and may quantitatively grasp the degree of inconsistency of the shape. In addition, since erroneous corresponding pairs are not displayed, the shape inspection work is made efficient.

Figure 10A:
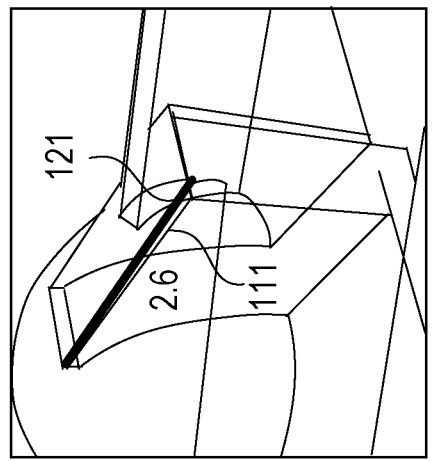
FIGS. 10A, 10B, and 10C are views illustrating corresponding pairs representing defective portions of the shape of an object.
Figure 10B:
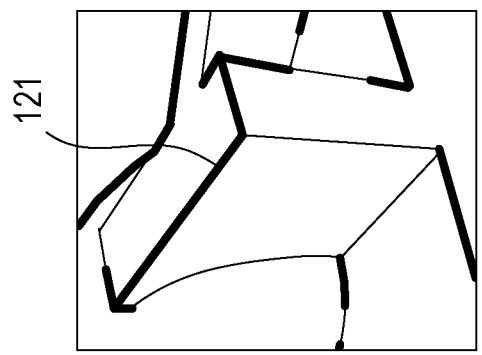

FIG. 10 illustrates an example of a corresponding pair representing a defective portion of the shape of the object. FIG. 10A illustrates a corresponding pair of the 3D line segment and the feature line 121 of the projection line 111 in FIG. 1, and FIG. 10B illustrates a plurality of feature lines including the feature line 121.

Figure 10C:
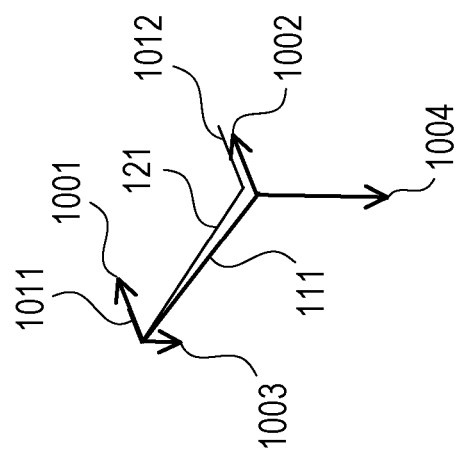

FIG. 10C illustrates another corresponding pair in the case where the corresponding pair in FIG. 10A is a corresponding pair to be determined. The projection lines 1001 to 1004 are projection lines of the 3D line segment connected to the 3D line segment of the projection line 111. The feature line 1011 is a feature line of the corresponding pair including the 3D line segment of the projection line 1001 and the feature line 1012 is a feature line of the corresponding pair including the 3D line segment of the projection line 1002.

For example, when the determination criterion (P2) is used, a corresponding pair including a 3D line segment connected to a 3D line segment included in the corresponding pair to be determined is selected as another corresponding pair. Therefore, the corresponding pair including the feature line 1011 and the corresponding pair including the feature line 1012 are selected as another corresponding pair. Then, since the feature line 121 included in the corresponding pair to be determined is connected to the feature line 1011 and the feature line 1012, the corresponding pair to be determined is classified as a defective portion.

Figure 11C:
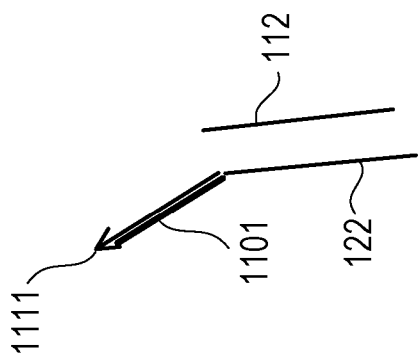
FIGS. 11A, 11B, and 11C are views illustrating erroneous corresponding pairs.
Figure 11B:
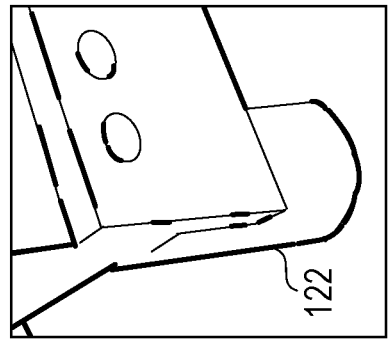
Figure 11A:
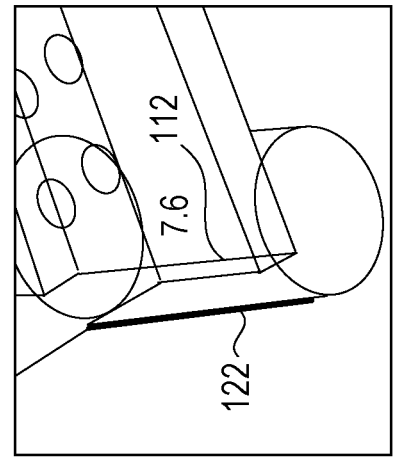

FIG. 11 illustrate an example of an erroneous corresponding pair. FIG. 11A illustrates a corresponding pair of the 3D line segment and the feature line 122 of the projection line 112 in FIG. 1, and FIG. 11B illustrates a plurality of feature lines including the feature line 122.

FIG. 11C illustrates another corresponding pair in the case where the corresponding pair in FIG. 11A is a corresponding pair to be determined. The feature line 1101 is a feature line connected to the feature line 122, and the projection line 1111 is a projection line of the 3D line segment of the corresponding pair including the feature line 1101.

For example, when the determination criterion (P1) is used, a corresponding pair including a feature line connected to a feature line included in a corresponding pair to be determined is selected as another corresponding pair. Therefore, the corresponding pair including the feature line 1101 is selected as another corresponding pair. Then, since the 3D line segment included in the corresponding pair to be determined is not connected to the 3D line segment included in another corresponding pair, the corresponding pair to be determined is classified as an erroneous corresponding pair.

When both the determination criterion (P1) and (P2) are used, the classification unit 420 may classify the corresponding pairs to be determined as corresponding pairs of defective portions or erroneous corresponding pairs by the following classification processing, for example.

```
// Determination of the connected state around the corresponding pair to be
determined for all the corresponding pairs to be determined
TP = corresponding pair to be determined
flag = ON
for all 3D line segments connected to the 3D line segment of TP
    if there is a corresponding pair OP including {the 3D line segment
    connected to the 3D line segment of TP}
        if feature line of OP and feature line of TP are not connected to
        each other
            flag = OFF
        end
    end
end
for all the feature lines connected to the feature lines of TP
    if there is a corresponding pair OP including {the feature line connected
    to the feature line of TP}
        if 3D line segment of OP and 3D line segment of TP are not
        connected to each other
            flag = OFF
        end
    end
end
// determination of erroneous corresponding pair or defective portion
if flag ==OFF
    TP = erroneous corresponding pair
else
    TP = corresponding pair of defective portion
end
end
```

In the classification process, when the distance between the end point of the feature line of OP and the end point of the feature line of TP is equal to or less than the threshold value D, it is determined that the feature line of OP and the feature line of TP are connected. On the other hand, when the distance is greater than the threshold value D, it is determined that the feature line of OP and the feature line of TP are not connected to each other.

In addition, it is determined that the 3D line segment of OP is connected to the 3D line segment of TP when the distance between the end point of the projection line representing the 3D line segment of OP and the end point of the projection line representing the 3D line segment of TP is equal to or less than the threshold value D. On the other hand, it is determined that the 3D line segment of OP and the 3D line segment of TP are not connected when the distance is greater than the threshold value D. For example, a value in the range of 1 to 10 pixels may be used as the threshold value D. The threshold value D may be several pixels.

FIG. 12 illustrates an example of a corresponding pair set 436 displayed on the screen. In this example, a correct corresponding pair and a corresponding pair of the defective portion among the corresponding pairs of the 3D line segment and the feature line illustrated in FIG. 1 are superimposed and displayed on the image of the object 101.

For example, the display unit 421 may highlight the corresponding pair of the defective portion by displaying the projection line and the feature line of the correct corresponding pair in blue, and displaying the projection line 111 and the feature line 121 of the corresponding pair of the defective portion in red. The display unit 421 may highlight the corresponding pair of the defective portion by changing the thickness, the line type, and the like, instead of changing the colors of the projection line and the feature line. The projection line 112 and the feature line 122 classified as an erroneous corresponding pair are not displayed on the screen in FIG. 12.

Likewise in FIG. 1, the number displayed near the projection line and the feature line represents a value obtained by converting the amount of deviation between the position of the projection line and the position of the feature line into the distance in the three-dimensional space with the unit being mm. The classification unit 420 may calculate the amount of deviation Err [mm] in the three-dimensional space by the following equation.

$$Err=(LA/LB)*h \qquad (7)$$

The LA [mm] in Equation (7) represents the length of the 3D line segment included in the corresponding pair in the three-dimensional space, and LB [pixel] represents the length of the projection line of the 3D line segment. The h [pixel] represents the average value of lengths of perpendicular line descending from both ends of the feature line included in the corresponding pair onto the projection line on the image 432.

The adjustment unit 422 adjusts the threshold value 439, and the display unit 421 highlights the corresponding pair of the defective portion according to the threshold value 439 adjusted by the adjustment unit 422.

Figure 13:
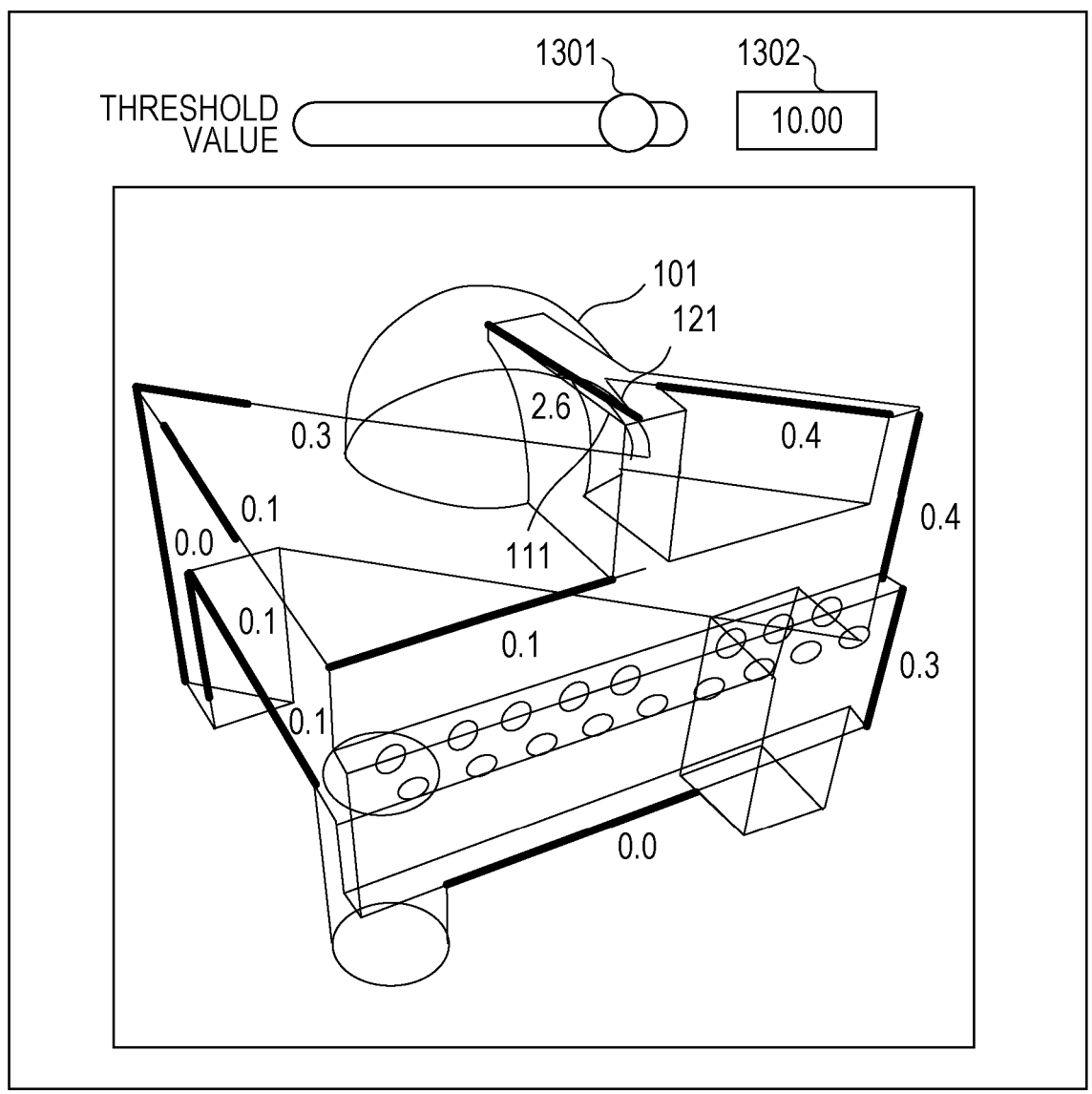
FIG. 13 is a view illustrating a GUI for adjusting a threshold value.

FIG. 13 illustrates an example of a graphical user interface (GUI) for adjusting the threshold value 439. By sliding a slider 1301, the user may change the threshold value 439 set by the threshold value setting unit 419, and the changed threshold value 439 is displayed in a box 1302.

The adjustment unit 422 changes the threshold value 439 according to the position of the slider 1301 and the classification unit 420 again classifies the corresponding pair of the corresponding pair set 436 using the changed threshold value 439. Then, the display unit 421 changes the display of the corresponding pair on the screen according to the classification result.

When the adjustment unit 422 is provided, the user may confirm whether or not the corresponding pair of the defective portion is changed while finely adjusting the threshold value 439 set by the threshold value setting unit 419.

The selection unit 423 selects a corresponding pair to be displayed from the corresponding pair set 436. The display unit 421 displays the corresponding pair to be displayed on the screen and highlights the corresponding pair of the defective portion of the corresponding pair to be displayed.

Figure 14:
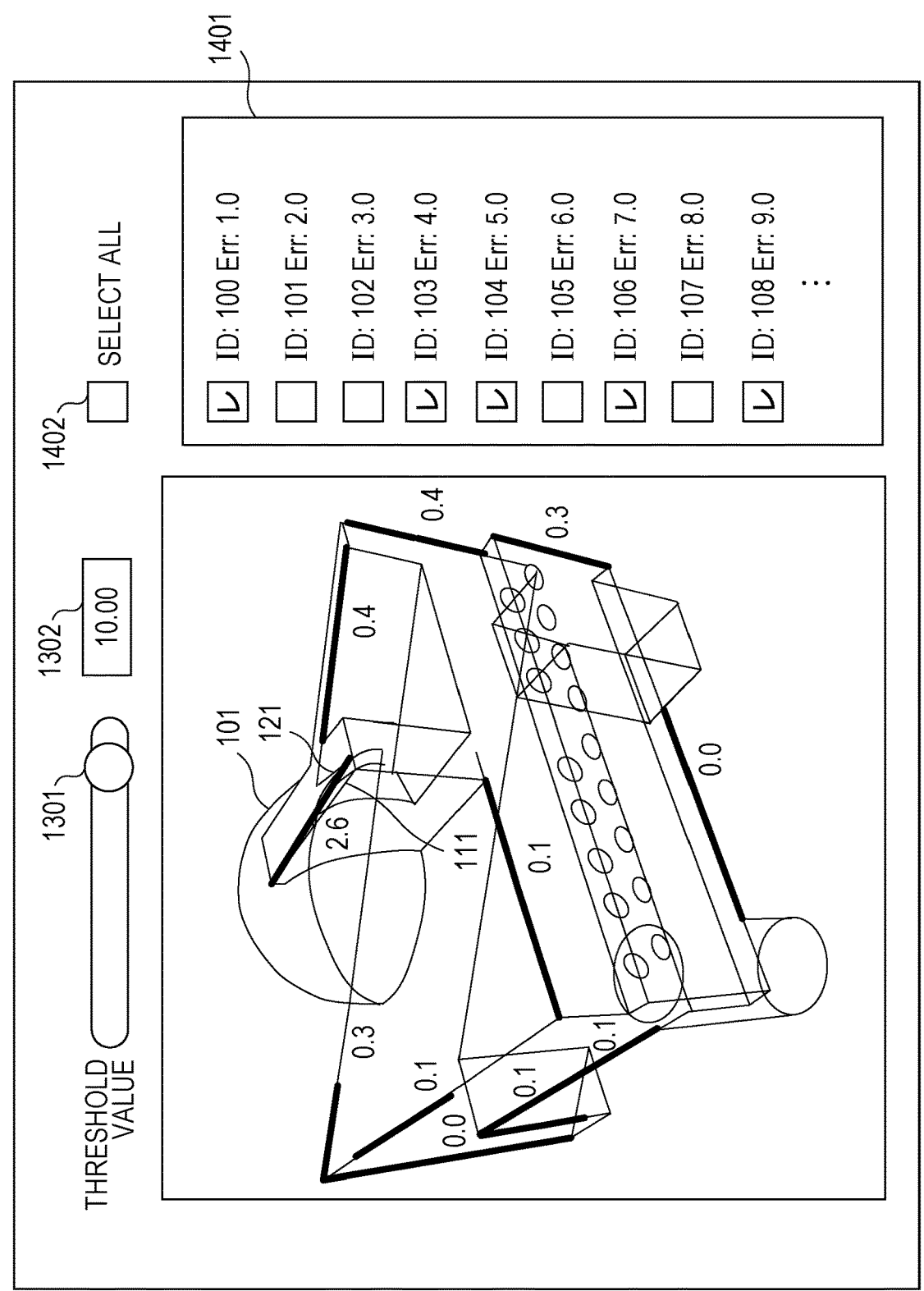
FIG. 14 is a view illustrating a GUI for selecting a corresponding pair to be displayed.

FIG. 14 illustrates an example of a GUI for selecting a corresponding pair to be displayed. In a list box 1401, a list of items including an ID as the identification information of the corresponding pair and an amount of deviation Err is displayed. The user may designate a corresponding pair to be displayed by checking each check box in the list box 1401. In addition, the user may designate all the corresponding pairs as the targets to be displayed, by checking the check box 1402 for selecting all.

When the selection unit 423 is provided, the user may narrow down the corresponding pairs to be displayed for display on the screen, and it is easy to confirm the defective portion.

According to the inspection apparatus 401 in FIG. 4, the threshold value with respect to the error is dynamically set based on the statistical value of the error between the projection line of the 3D line segment representing the shape of the object and the feature line detected from the image of the object. Since the set threshold value is a threshold value reflecting the shape of each object, it is possible to accurately identify a defective portion that does not coincide with the CAD data by classifying the corresponding pairs using this threshold value. Also, in the visual confirmation by the user, the defective portion which is likely to be overlooked is also extracted and the amount of deviation of the defective portion is quantitatively displayed, and the inspection result is easily stored.

Figure 15A:
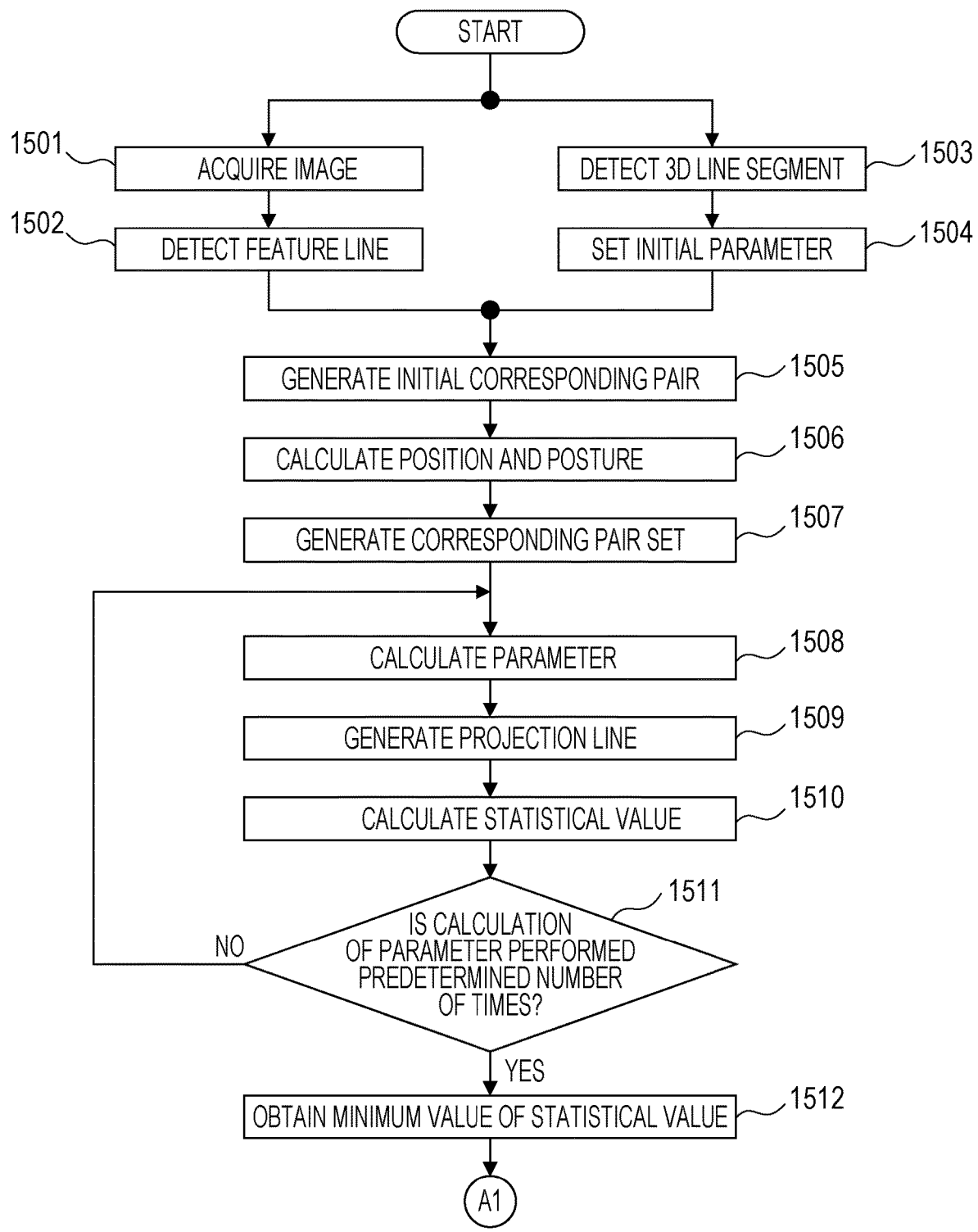
FIG. 15A is a flowchart (Part 1) illustrating the first detailed embodiment of image processing.
Figure 15B:
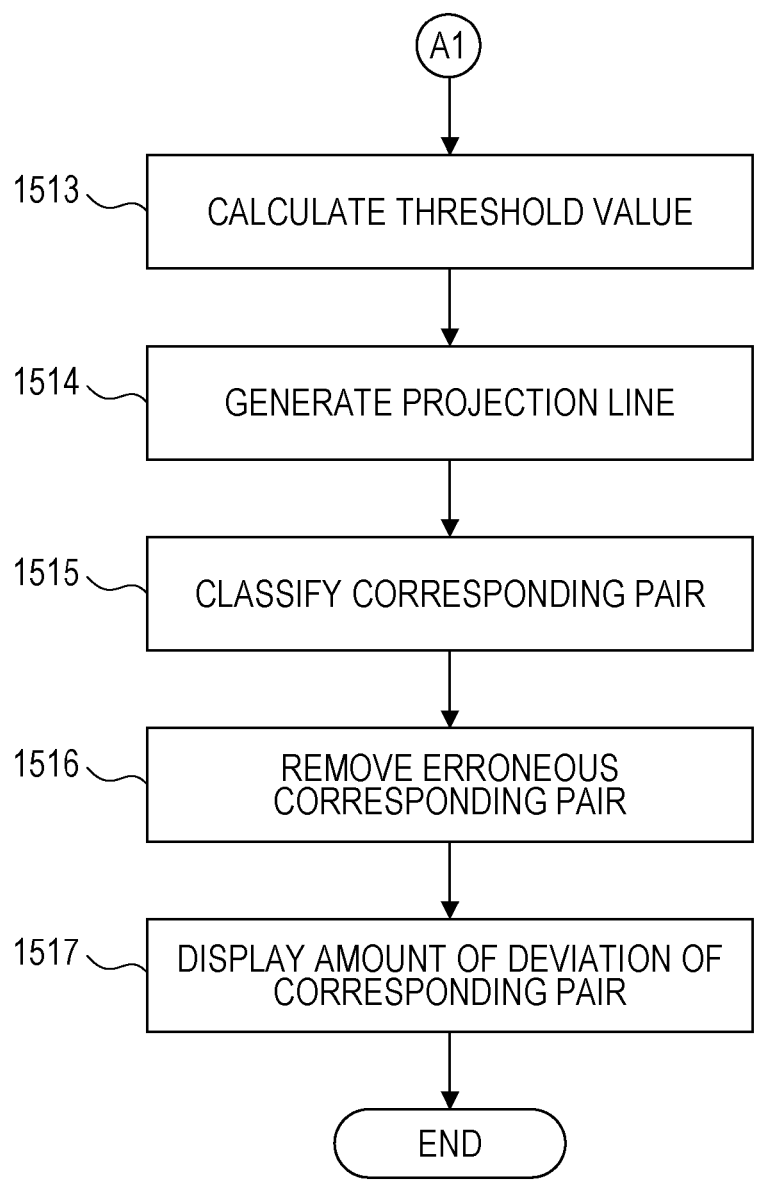
FIG. 15B is a flowchart (Part 2) illustrating the first detailed embodiment of image processing.

FIGS. 15A and 15B are flowcharts illustrating a first detailed embodiment of image processing performed by the inspection apparatus 401 in FIG. 4. First, the image acquisition unit 412 acquires an image 432 from the image capturing apparatus 402 (step 1501), and the feature line detection unit 413 detects a plurality of feature lines 433 from the image 432 (step 1502).

In addition, the line segment detection unit 414 detects a plurality of 3D line segments 434 from the CAD data 331 (step 1503), and the parameter setting unit 415 sets initial parameters 435 representing the initial position and the initial orientation of the image capturing apparatus 402 (step 1504).

Next, the generation unit 416 removes hidden lines from the 3D line segment 434 and generates k initial corresponding pairs from the remaining 3D line segments (step 1505), and the parameter calculation unit 417 calculates the position and the orientation of the image capturing apparatus 402 using the k initial corresponding pairs (step 1506).

Next, the generation unit 416 generates one or more additional corresponding pairs using the position and orientation of the image capturing apparatus 402, and generates a corresponding pair set 436 including the initial corresponding pair and the additional corresponding pair (step 1507).

Next, the parameter calculation unit 417 randomly selects k corresponding pairs among N corresponding pairs included in the corresponding pair set 436 to calculate the parameter 437 by using the selected k corresponding pairs (step 1508).

Next, the error calculation unit 418 generates N−k projection lines by projecting the 3D line segments included in the remaining N−k corresponding pairs in the corresponding pair set 436 onto the image 432 by using the parameter 437 (step 1509). Then, the error calculation unit 418 calculates an error between the position of the projection line and the position of the feature line, and calculates the statistical value 438 of N−k errors (step 1510).

Next, the parameter calculation unit 417 checks whether or not the calculation of the parameter 437 is performed the predetermined number of times (step 1511). For the predetermined number of times, the number of times M calculated by the following equation may be used, for example.

$$M=\log(1-p)/\log(1-(1-e)^k) \qquad (8)$$

In Equation (8), e represents a ratio of the corresponding pair and erroneous corresponding pair of the defective portion included in the corresponding pair set 436, and p represents the probability that the ratio is e. For example, when k=4, e=0.3, and p=0.99, M is 17 times.

When the calculation of the parameter 437 is not performed the predetermined number of times (NO in step 1511), the inspection apparatus 401 changes the selection of the k corresponding pairs and repeats the processing in step 1508 and the subsequent processing.

When the calculation of the parameter 437 is performed the predetermined number of times (YES in step 1511), the error calculation unit 418 obtains the minimum value of the statistical value 438 (step 1512). Then, the threshold value setting unit 419 calculates the threshold value 439 using the minimum value of the statistical value 438 (step 1513).

Next, the classification unit 420 selects the parameter 437 used for calculating the minimum value of the statistical value 438, and uses the selected parameter 437 to project the 3D line segment included in the corresponding pair set 436 onto the image 432, and a projection line is generated (step 1514). Then, the classification unit 420 classifies the corresponding pairs by comparing the error between the position of the projection line and the position of the feature line with the threshold value 439 (step 1515) and excludes the erroneous corresponding pair from the display target (step 1516).

Next, the display unit 421 displays the correct corresponding pair and the corresponding pair of the defective portion on the screen, and displays the amount of deviation between the 3D line segment and the feature line of each corresponding pair (step 1517).

According to the image processing in FIG. 15, the position and orientation of the image capturing apparatus 402 are estimated using the k corresponding pairs selected from the corresponding pair set 436, and the error of the remaining N−k corresponding pairs may be calculated using the estimated position and orientation. Therefore, when N is sufficiently greater than k, it is possible to evaluate the error of most of the corresponding pairs included in the corresponding pair set 436 and determine the threshold value 439.

It is possible to suppress the influence of the external error value with respect to the threshold value 439, and the accuracy of the threshold value 439 is enhanced by repeating the process of changing the selection of k corresponding pairs to obtain the statistical value 438 of the error and determining the threshold value 439 using the minimum value of the statistical value 438. Therefore, it is possible to accurately distinguish between corresponding pairs of good shape and corresponding pairs of defective portion.

In step 1511, the inspection apparatus 401 may terminate the iterative processing when a predetermined time has elapsed from the start of the processing, instead of terminating the iterative processing when the calculation of the parameter 437 is performed the predetermined number of times.

The processing of step 1508 to 1510 may be repeatedly performed with respect to all combinations of k corresponding pairs included in the corresponding pair set 436 instead of selecting k corresponding pairs at random when there is a margin in calculation time. In this case, the $_NP_k$ based combinations may be generated in consideration of the order of the k corresponding pairs, and the N corresponding pairs may be sorted in the order of the longer projection lines of the 3D line segment in advance, then the $_NC_k$ based combinations from the N corresponding pairs after sorting may be generated.

When the k corresponding pairs are randomly selected to calculate the statistical value 438 of the error and the iterative processing is terminated after the predetermined number of times, the processing time is shortened, but the minimum value of the statistical value 438 may be changed according to the result of selecting the k corresponding pairs. On the other hand, when the statistical value 438 of the error is calculated with respect to all combinations, the processing time is somewhat longer, but the same minimum value is obtained each time with respect to the same image 432, so that stable classification results is obtained.

A threshold value Np with respect to the number of corresponding pairs may be set, in which case the processing may be repeated with respect to all combinations of k corresponding pairs when N<Np, and the iterative processing may be terminated after the predetermined number of times when N≥Np.

Figure 16:
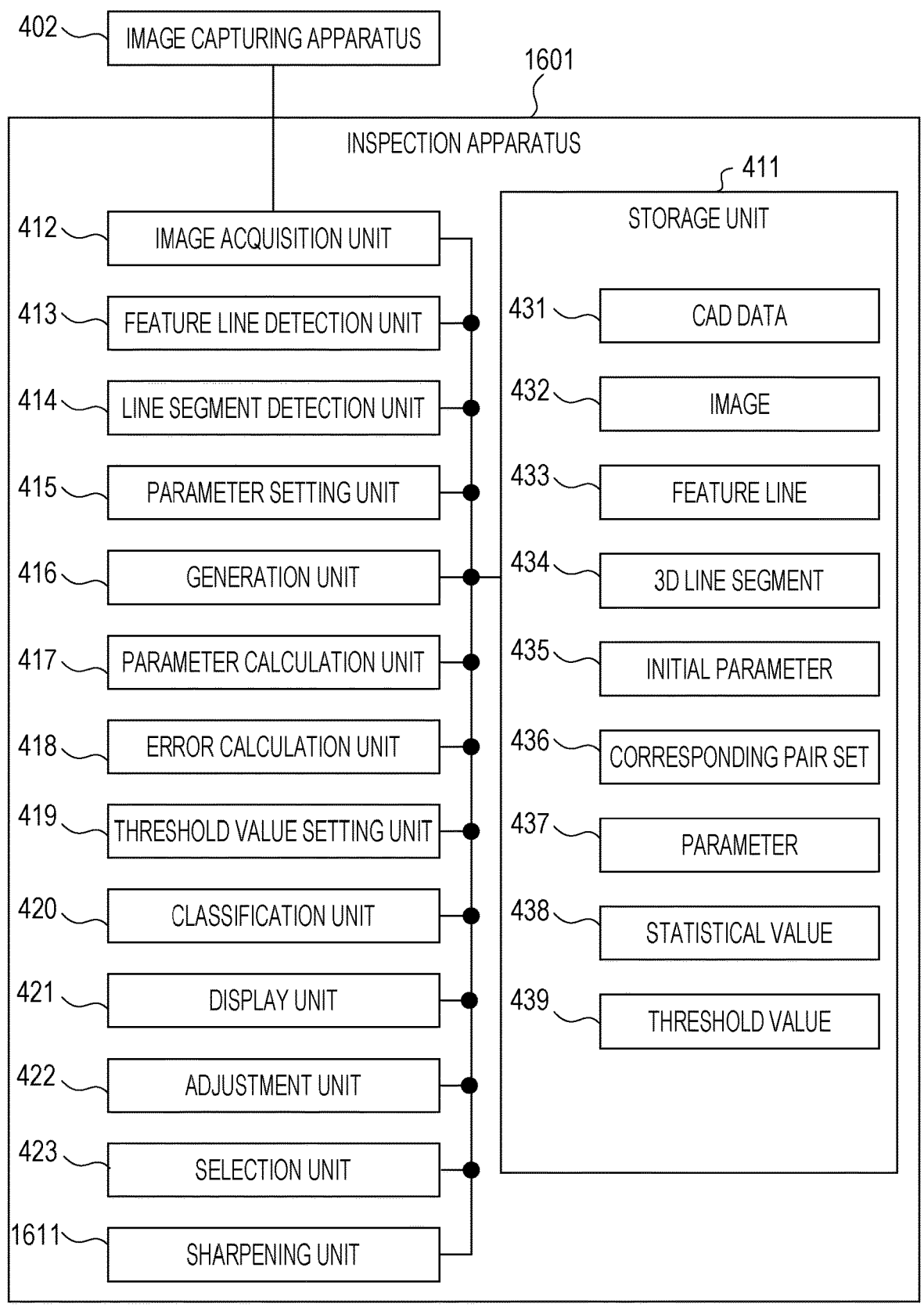
FIG. 16 is a functional block diagram of a second detailed embodiment of the inspection apparatus.

FIG. 16 illustrates a second detailed embodiment of the inspection apparatus 201 in FIG. 2. The inspection apparatus 1601 in FIG. 16 has a configuration in which a sharpening unit 1611 is added to the inspection apparatus 401 in FIG. 4.

The sharpening unit 1611 selects the projection line of the 3D line segment included in the corresponding pair to be determined extracted by the classification unit 420 and sharpens the image of a predetermined region that includes the selected projection line. For example, the sharpening unit 1611 may apply unsharp masking filtering processing with respect to the image of the predetermined region to sharpen the image. Even when certain portion of the feature line is not detected from the image 432 due to the influence of ambient light or the like, the possibility of detecting the feature line is increased since the image of that portion is sharpened.

The feature line detection unit 413 again performs edge detection processing on the image of the sharpened predetermined region to detect the feature line from the predetermined region. As a result, the additional feature lines to be added with respect to the corresponding pair set 436 are detected.

The generation unit 416 generates a new additional corresponding pair by correlating the additional 3D line segment and the additional feature line to be added to the corresponding pair set 436 with each other. Then, the classification unit 420 performs classification processing again, using the additional corresponding pair generated by the generation unit 416 as another corresponding pair.

Figure 17:
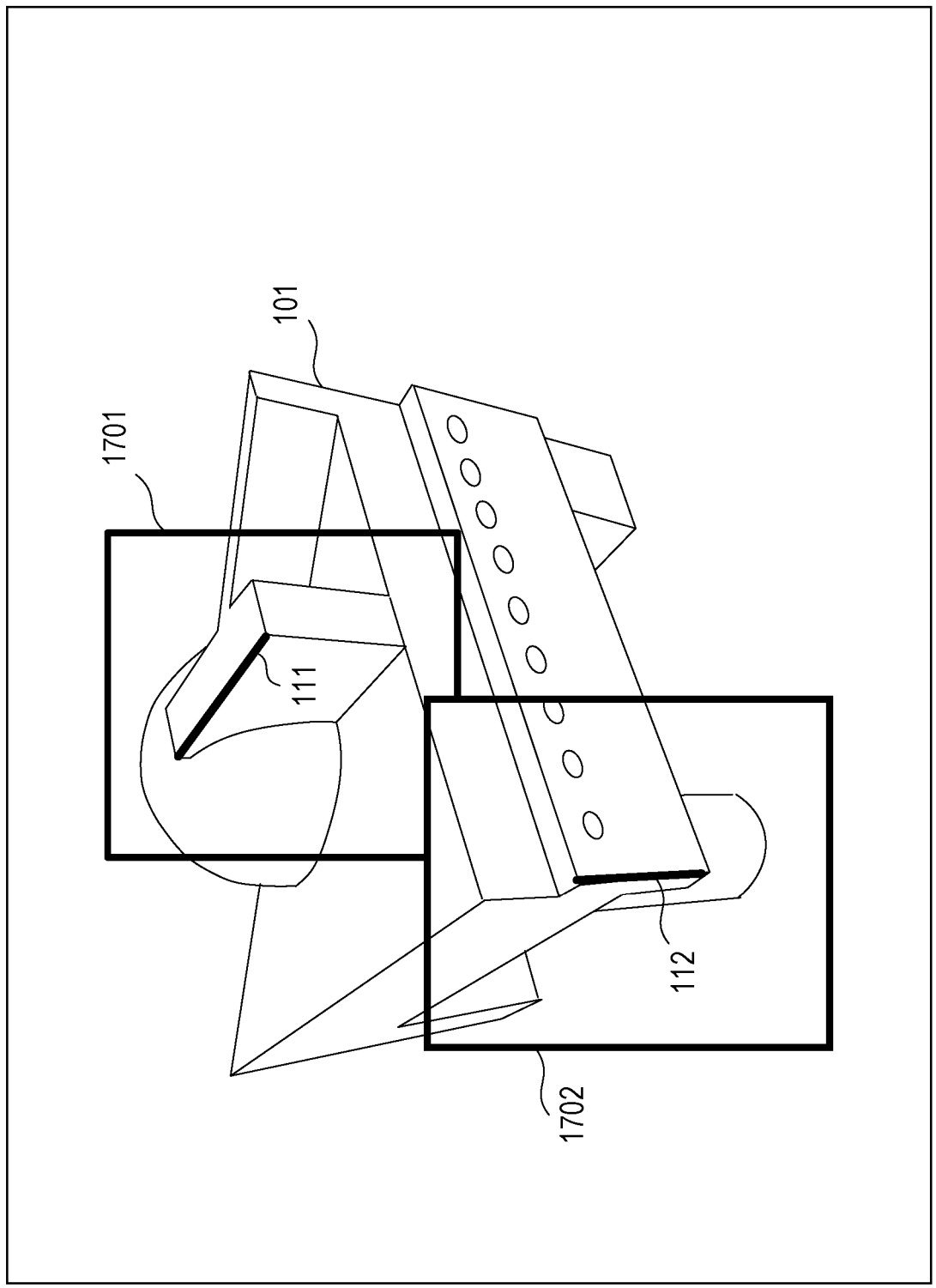
FIG. 17 is a view illustrating a predetermined region including projection lines.

FIG. 17 illustrates an example of a predetermined region including projection lines. The rectangular region 1701 represents a predetermined region including the projection line 111, and the rectangular region 1702 represents a predetermined region including the projection line 112. The horizontal side of the rectangular region 1701 in the horizontal direction is a predetermined distance apart from the end point of the projection line 111 in the vertical direction, and the vertical side of the rectangular region 1701 is a predetermined distance apart from the end point of the projection line 111 in the horizontal direction. A value of about several tens of pixels may be used as the predetermined distance, for example.

Likewise, the horizontal side of the rectangular region 1702 is a predetermined distance apart from the end point of the projection line 112 in the vertical direction and the vertical side of the rectangular region 1702 is a predetermined distance apart from the end point of the projection line 112 in the horizontal direction.

When the sharpening unit 1611 is provided, it is possible to detect a new feature line from an area where the feature line is not detected and generate a new additional corresponding pair. By performing classification processing using a new additional corresponding pair as another corresponding pair, the number of determination targets of the determination processing based on the connected state is increased, and the extraction accuracy of the erroneous corresponding pair is enhanced.

In step 1507 in FIG. 15A, even when an upper limit is provided for the number of the additional feature lines and the feature lines shorter than a predetermined value are excluded from the candidate additional feature lines, such a feature line may be newly added and displayed on the screen.

Figure 18A:
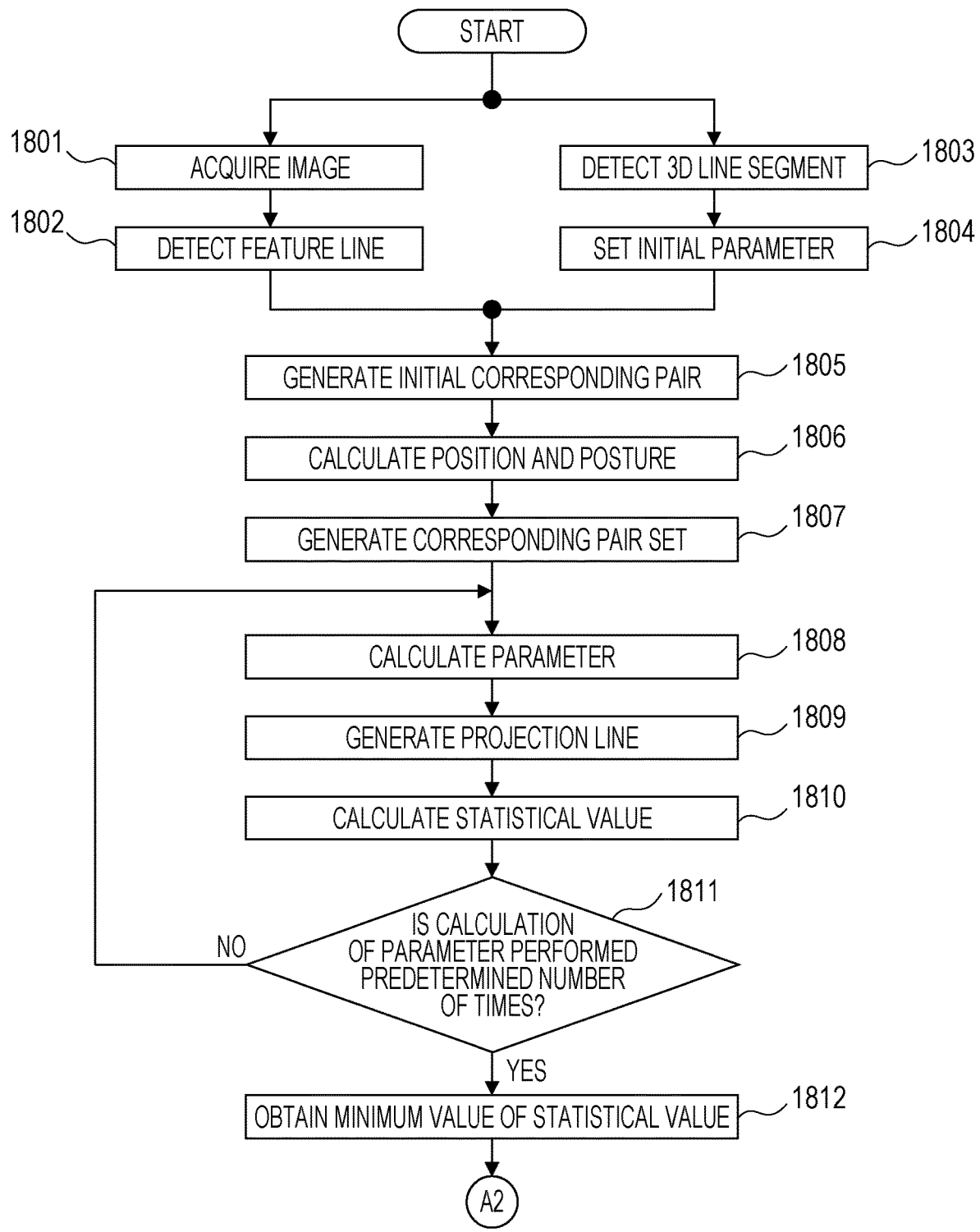
FIG. 18A is a flowchart (Part 1) illustrating the second detailed embodiment of image processing.
Figure 18B:
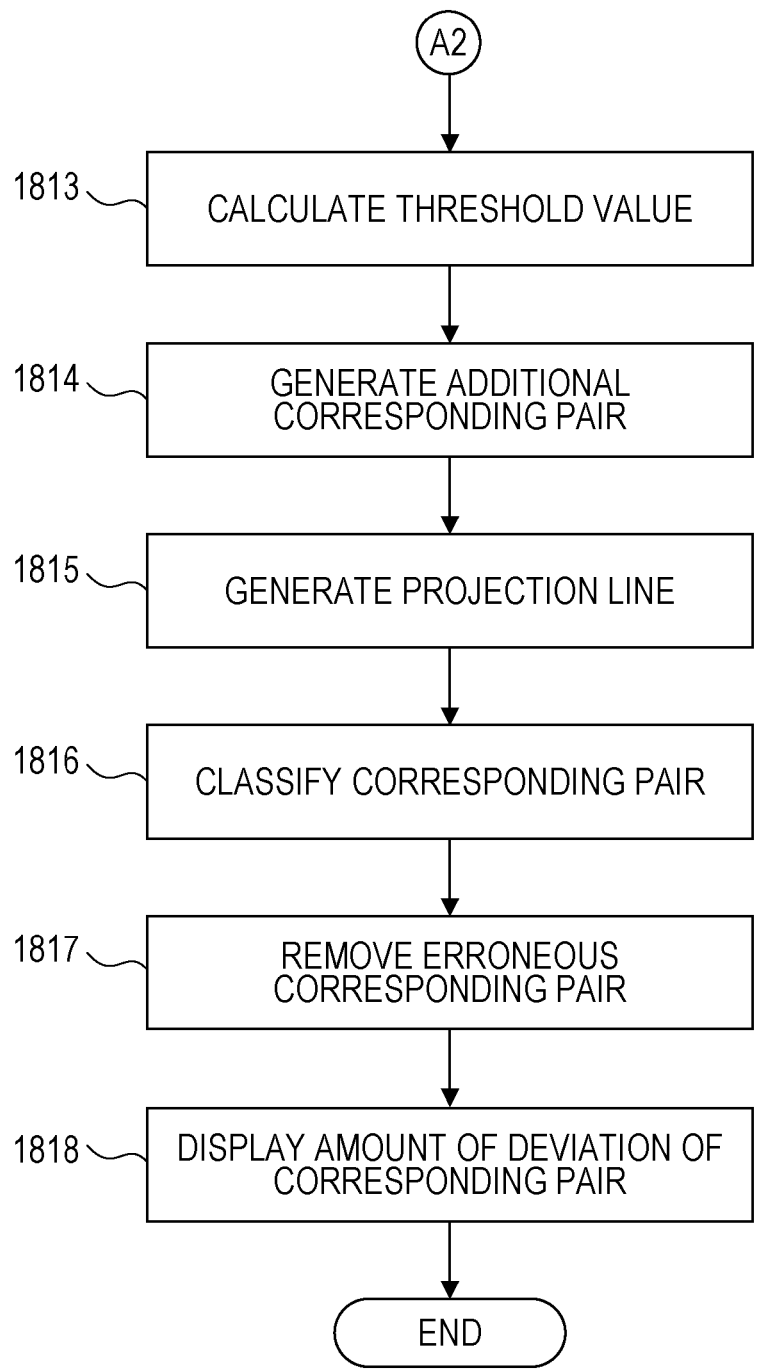
FIG. 18B is a flowchart (Part 2) illustrating the second detailed embodiment of image processing.

FIGS. 18A and 18B are flowcharts illustrating a second detailed embodiment of the image processing performed by the inspection apparatus 1601 in FIG. 16. The processing of steps 1801 to 1813 and steps 1815 to 1818 is the same as the processing of steps 1501 to 1517 in FIG. 15.

In step 1814, the inspection apparatus 1601 generates additional corresponding pairs. First, the sharpening unit 1611 sharpens the image of the predetermined region including the projection line of the 3D line segment included in the corresponding pair to be determined. Then, the feature line detection unit 413 detects a feature line from the image of the sharpened predetermined region.

Next, likewise the processing in step 1807, the generation unit 416 generates one or more additional corresponding pairs with respect to the predetermined region and adds the generated corresponding pairs to the corresponding pair set 436. Then, the inspection apparatus 1601 performs the processing from step 1815 and onward using the corresponding pair set 436 to which the additional corresponding pair is added.

The configurations of the inspection apparatus of FIGS. 2, 4, and 16 are merely examples, and some components may be omitted or changed according to the use or conditions of the inspection apparatus. For example, in the inspection apparatus of FIGS. 4 and 16, the image acquisition unit 412 may be omitted when the image 432 is stored in advance in the storage unit 411. Other shape information representing the shape of the object may be used instead of the CAD data 431.

The display unit 421 may be omitted in the inspection apparatus of FIGS. 4 and 16, when the external apparatus displays the corresponding pair set 436. The adjustment unit 422 may be omitted when it may not to adjust the threshold value 439, and the selection unit 423 may be omitted when it may not to select a corresponding pair to be displayed.

The flowcharts in FIGS. 3, 15A, 15B, 18A, and 18B are merely examples, and a part of the processing may be omitted or changed according to the configuration or conditions of the inspection apparatus. For example, the processing of step 1501 in FIG. 15A and step 1801 in FIG. 18A may be omitted when the image 432 is stored in advance in the storage unit 411.

The projection line and feature line in FIG. 1, the CAD data in FIG. 5, the 3D line segment and feature line in FIG. 6 are merely examples, and the CAD data, the 3D line segment, the projection lines, and the feature lines are changed according to the object to be captured and the configuration or conditions of the inspection apparatus.

The calculation method of the error of FIGS. 7 and 8 is merely an example, and another calculation method may be used according to the configuration or condition of the inspection apparatus. The error in FIG. 9 is merely an example, and the error between the projection line and the feature line is changed according to the object to be captured and the configuration or condition of the inspection apparatus.

The corresponding pair illustrating the defective portion in FIG. 10, the erroneous corresponding pair in FIG. 11, and the corresponding pair set in FIG. 12 are merely examples, and the corresponding pairs are changed according to the object to be captured and the configuration or condition of the inspection apparatus.

The GUIs in FIGS. 13 and 14 are merely examples, and another GUI may be used according to the configuration or condition of the inspection apparatus. The predetermined region in FIG. 17 is merely an example, and predetermined regions with different shapes or different sizes may be used according to the configuration or conditions of the inspection apparatus.

The calculation formulas of Equations (1) to (8) are merely examples, and another calculation formula may be used according to the configuration or conditions of the inspection apparatus.

Figure 19:
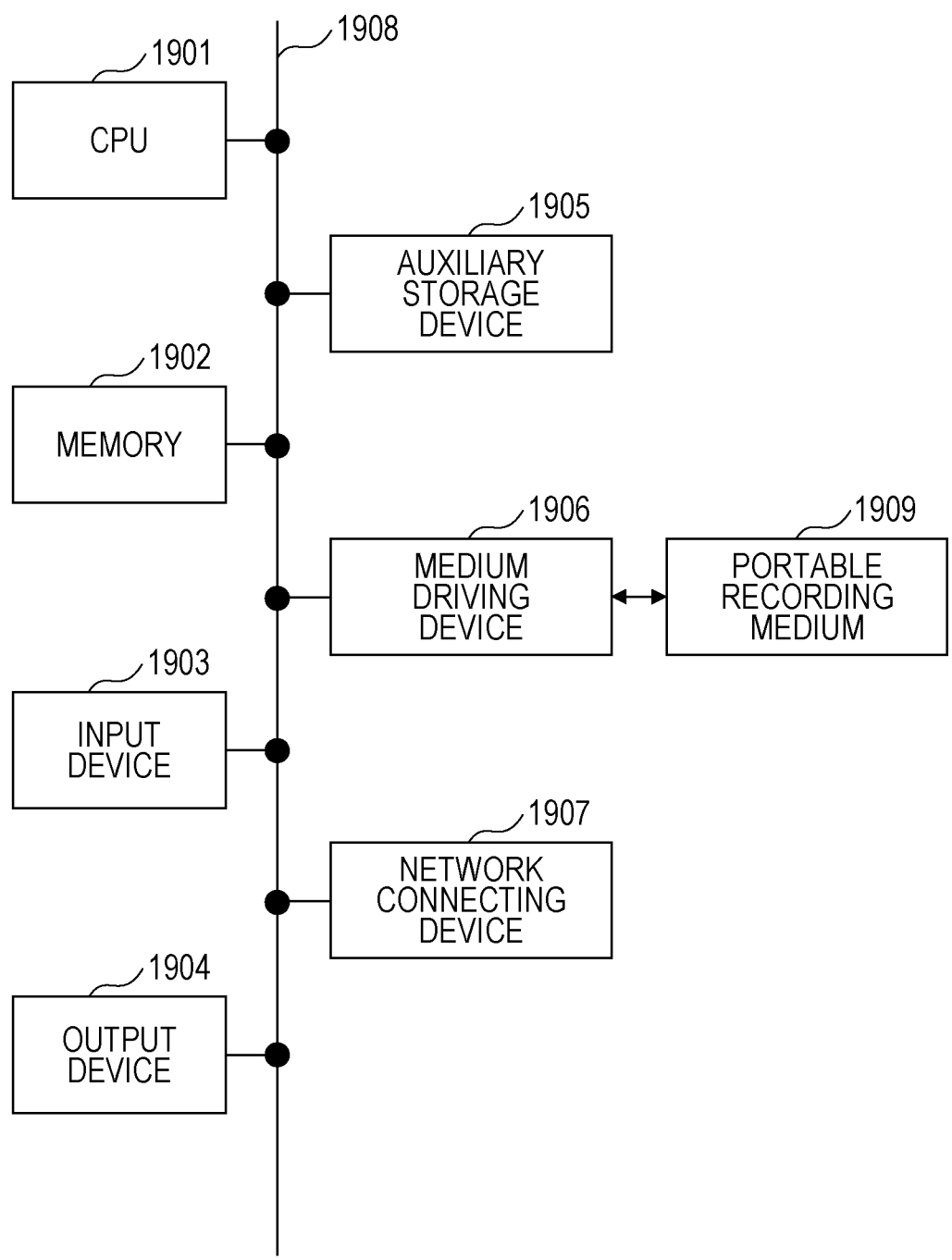
FIG. 19 is a functional block diagram of an information processing apparatus.

FIG. 19 illustrates an example of a configuration of an information processing apparatus (computer) used as the inspection apparatus in FIGS. 2, 4, and 16. The information processing apparatus in FIG. 19 includes a central processing unit (CPU) 1901, a memory 1902, an input device 1903, an output device 1904, an auxiliary storage device 1905, a medium driving device 1906, and a network connection device 1907. These components are connected to each other by a bus 1908. The image capturing apparatus 402 in FIGS. 4 and 16 may be connected to the bus 1908.

The memory 1902 is a semiconductor memory such as a read only memory (ROM), a random-access memory (RAM), a flash memory, and stores programs and data used for processing. The memory 1902 may be used as the storage unit 211 of FIG. 2 or the storage unit 411 of FIGS. 4 and 16.

The CPU 1901 (processor) operates as the detection unit 212, the generation unit 213, the setting unit 214, and the classification unit 215 in FIG. 2 by executing a program using the memory 1902, for example.

The CPU 1901 also operates as the image acquisition unit 412, the feature line detection unit 413, the line segment detection unit 414, and the parameter setting unit 415 in FIGS. 4 and 16 by executing a program using the memory 1902. The CPU 1901 also operates as the generation unit 416, the parameter calculation unit 417, the error calculation unit 418, the threshold value setting unit 419, the classification unit 420, the adjustment unit 422, and the selection unit 423 by executing a program using the memory 1902.

The CPU 1901 also operates as the sharpening unit 1611 in FIG. 16 by executing a program using the memory 1902.

The input device 1903 is a keyboard, a pointing device, or the like, and is used for inputting instructions or information from an operator or a user, for example. The output device 1904 is a display device, a printer, a speaker or the like, for example, and is used for outputting inquiries or instructions and a processing result to the operator or the user. The processing result may be a projection line and a feature line representing the classified corresponding pair. The output device 1904 may be used as the display unit 421 in FIGS. 4 and 16.

The auxiliary storage device 1905 is a magnetic disk device, an optical disk device, a magneto-optical disk device, a tape device, or the like, for example. The auxiliary storage device 1905 may be a hard disk drive or a flash memory. The information processing apparatus may cause the auxiliary storage device 1905 to store programs and data and load the programs and data into the memory 1902 for use. The auxiliary storage device 1905 may be used as the storage unit 211 in FIG. 2 or the storage unit 411 in FIGS. 4 and 16. The storage unit may be referred to as a memory.

The medium driving device 1906 drives the portable recording medium 1909 and accesses the recorded contents. The portable recording medium 1909 is a memory device, a flexible disk, an optical disk, a magneto-optical disk, or the like. The portable recording medium 1909 may be a compact disk read only memory (CD-ROM), a digital versatile disk (DVD), a universal serial bus (USB) memory, or the like. An operator or a user may cause the portable recording medium 1909 to store programs and data and load the programs and data into the memory 1902 for use.

As described above, the computer readable recording medium storing the program and data used for the image processing is a physical (non-transitory) storage medium such as the memory 1902, the auxiliary storage device 1905, or the portable recording medium 1909.

The network connection device 1907 is a communication interface circuit which is connected to a communication network such as local area network (LAN), wide area network (WAN), and performs data conversion for communication. The information processing apparatus may receive programs and data from an external device through the network connection device 1907 and load the programs and data into the memory 1902 for use.

The information processing apparatus may not include all the components in FIG. 19, and it is also possible to omit some components according to the use or condition. For example, the medium driving device 1906 or the network connection device 1907 may be omitted when the portable recording medium 1909 or a communication network is not used.

While the disclosed embodiments and their advantages have been described in detail, those skilled in the art may make various modifications, additions, and omissions without departing from the scope of the embodiment explicitly set forth in the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An inspection apparatus comprising:
    a memory for storing shape information including a plurality of line segments representing a shape of an object; and
    a processor coupled to the memory and the processor that
        detects a plurality of feature lines from an image of the object,
        generates a plurality of combinations obtained by correlating each of the plurality of line segments and each of the plurality of feature lines with each other,
        generates a plurality of projection lines by projecting each of the plurality of line segments onto the image,
        sets a threshold value with respect to an error between a position of the projection lines and a position of the feature lines of the line segments included in each of the plurality of combinations based on a statistical value of the error,
        classifies the plurality of combinations using the threshold value,
        displays a part or all of the plurality of combinations on a screen,
        extracts a combination having an error greater than the threshold value from among the plurality of combinations,
        determines whether or not to classify the extracted combination as a defective portion of the shape of the object based on a connected state between the line segments included in the extracted combination and the line segments included in another combination, and
        highlights the combination classified as the defective portion of the shape of the object.

2. The inspection apparatus according to claim 1, wherein the processor selects a combination that includes a second feature line having an end point at a distance less than a predetermined value from an end point of a first feature line included in the combination extracted from among the plurality of combinations as the other combination, and
    when the distance between the end point of the first line segment included in the extracted combination and the end point of the second line segment included in the other combination is less than the predetermined value, the processor classifies the extracted combination as the defective portion of the shape of the object.

3. The inspection apparatus according to claim 1, wherein, when the distance between the end point of the first line segment and the end point of the second line segment is greater than the predetermined value, the processor classifies the extracted combination as an erroneous combination.

4. The inspection apparatus according to claim 1, wherein the processor selects a combination including a second line segment having an end point at a distance by less than a predetermined value from an end point of a first line segment included in the combination extracted from among the plurality of combinations as the other combination, and
    when the distance between the end point of the first feature line included in the extracted combination and the end point of the second feature line included in the other combination is less than the predetermined value, the processor classifies the extracted combination as the defective portion of the shape of the object.

5. The inspection apparatus according to claim 4, wherein, when the distance between the end point of the first feature line and the end point of the second feature line is greater than the predetermined value, the processor classifies the extracted combination as an erroneous combination.

6. The inspection apparatus according to claim 1, wherein the processor highlights the combination classified as the defective portion of the shape of the object according to an adjusted threshold value.

7. The inspection apparatus according to claim 1, wherein the processor
    selects combinations of display targets from among the plurality of combinations,
    displays the combinations of the display targets on the screen and highlights a combination that is classified as the defective portion of the shape of the object from among the combinations of the display target.

8. The inspection apparatus according to claim 1, wherein the processor
    sharpens an image of a predetermined region including the projection line of the line segment included in the extracted combination,
    detects an additional feature line other than the plurality of feature lines from the sharpened image of the predetermined region,
    generates an additional combination obtained by correlating an additional line segment other than the plurality of line segments and the additional feature line with each other, and
    determines whether or not to classify the extracted combination as the defective portion of the shape of the object using the additional combination as the other combination.

9. The inspection apparatus according to claim 1, wherein the processor classifies a combination having an error less than the threshold value as a correct combination from among the plurality of combinations.

10. The inspection apparatus according to claim 1, wherein the statistical value of the error is a median value of an error between the position of the projection line of the line segment and the position of the feature line included in each of the plurality of combinations.

11. An inspection method executed by a computer, comprising:
    detecting a plurality of feature lines from an image of an object captured by an image capturing apparatus;
    generating a plurality of combinations obtained by correlating each of a plurality of line segments included in shape information representing a shape of the object and each of the plurality of feature lines with each other;
    generating a plurality of projection lines by projecting each of the plurality of line segments onto the image;
    setting a threshold value for an error between a position of a projection line and a position of the feature line included in each of the plurality of combinations based on a statistical value of the error,
    classifying the plurality of combinations using the threshold value,
    displaying a part or all of the plurality of combinations on a screen,
    extracting a combination having an error greater than the threshold value from among the plurality of combinations,
    determining whether or not to classify the extracted combination as a defective portion of the shape of the object based on a connected state between the line segments included in the extracted combination and the line segments included in another combination, and
    highlighting the combination classified as the defective portion of the shape of the object.

12. A non-transitory computer readable recording medium storing an inspection program causing a computer to execute a process, the process comprising:
    detecting a plurality of feature lines from an image of an object captured by an image capturing apparatus;
    generating a plurality of combinations obtained by correlating each of a plurality of line segments included in shape information representing a shape of the object and each of the plurality of feature lines with each other;
    generating a plurality of projection lines by projecting each of the plurality of line segments onto the image;
    setting a threshold value for an error between a position of the projection lines and a position of the feature lines included in each of the plurality of combinations based on a statistical value of the error;
    classifying the plurality of combinations using the threshold value;
    displaying a part or all of the plurality of combinations on a screen;
    extracting a combination having an error greater than the threshold value from among the plurality of combinations;
    determining whether or not to classify the extracted combination as a defective portion of the shape of the object based on a connected state between the line segments included in the extracted combination and the line segments included in another combination; and
    highlighting the combination classified as the defective portion of the shape of the object.

* * * * *